United States Patent
Johnson et al.

(10) Patent No.: US 12,348,700 B2
(45) Date of Patent: Jul. 1, 2025

(54) REAL-TIME NOVEL VIEW SYNTHESIS WITH FORWARD WARPING AND DEPTH

(71) Applicant: The Regents of The University of Michigan, Ann Arbor, MI (US)

(72) Inventors: Justin Johnson, Ann Arbor, MI (US); Ang Cao, Ann Arbor, MI (US); Chris Rockwell, Ann Arbor, MI (US)

(73) Assignee: The Regents of the University of Michigan, Ann Arbor, MI (US)

( * ) Notice: Subject to any disclaimer, the term of this patent is extended or adjusted under 35 U.S.C. 154(b) by 324 days.

(21) Appl. No.: 17/739,572

(22) Filed: May 9, 2022

(65) Prior Publication Data
US 2023/0362347 A1 Nov. 9, 2023

(51) Int. Cl.
| | |
|---|---|
| H04N 13/275 | (2018.01) |
| G06T 3/18 | (2024.01) |
| G06V 10/77 | (2022.01) |
| H04N 13/257 | (2018.01) |
| H04N 13/00 | (2018.01) |
| H04N 13/282 | (2018.01) |

(52) U.S. Cl.
CPC ............ *H04N 13/275* (2018.05); *G06T 3/18* (2024.01); *G06V 10/7715* (2022.01); *H04N 13/257* (2018.05); *H04N 2013/0088* (2013.01); *H04N 13/282* (2018.05)

(58) Field of Classification Search
CPC .. H04N 13/275; H04N 13/257; H04N 13/282; H04N 2013/0088; G06V 10/7715; G06T 3/18
See application file for complete search history.

(56) References Cited

U.S. PATENT DOCUMENTS

| | | | |
|---|---|---|---|
| 2013/0215220 A1* | 8/2013 | Wang ................... | H04N 13/296 348/E13.064 |
| 2017/0293810 A1* | 10/2017 | Allen ..................... | G01C 21/26 |
| 2020/0226816 A1* | 7/2020 | Kar ....................... | G06V 10/247 |

OTHER PUBLICATIONS

Zhu, Shiping, "An Improved Depth Image Based Virtual View Synthesis Method for Interactive 3D Video", Aug. 2019, IEEE Access, vol. 7, pp. 115171-115180 (Year: 2019).*
Le, Hoang-An, "Novel View Synthesis from Single Images via Point Cloud Transformation", Computer Vision and Pattern Recognition, Sep. 2020, arXiv, pp. 1-19 (Year: 2020).*
Song, Zhembo, "Deep Novel View Synthesis from Colored 3D Point Clouds". Computer Vision—ECCV 2020, Nov. 2020, SpringerLink, pp. 1-17 (Year: 2020).*
Aanaes, H. et al., Large-Scale Data for Multiple-View Stereopsis, International Journal of Computer Vision, 2016, 120:153-168.

(Continued)

*Primary Examiner* — Terrell M Robinson
(74) *Attorney, Agent, or Firm* — Quarles & Brady LLP

(57) ABSTRACT

A fast and generalizable novel view synthesis method with sparse inputs is disclosed. The method may comprise: accessing at least a first input image with a first view of a subject in the first input image, and a second input image with a second view of the subject in the second input image using a computer system; estimating depths for pixels in the at least first and second input images; constructing a point cloud of image features from the estimated depths; and synthesizing a novel view by forward warping by using a point cloud rendering of the constructed point cloud.

20 Claims, 12 Drawing Sheets

(56) References Cited

OTHER PUBLICATIONS

Brock, A. et al., Large Scale GAN Training for High Fidelity Natural Image Synthesis, arXiv:1809.11096, 2018, pp. 1-29.
Carion, N. et al., End-to-End Object Detection with Transformers, In European Conference on Computer Vision, 2020, pp. 213-229.
Chang, A. et al., ShapeNet: An Information-Rich 3D Model Repository, arXiv:1512.03012, 2015, pp. 1-11.
Chang, A. et al., Matterport3D: Learning from RGB-D Data in Indoor Environments, arXiv:1709.06158, 2017, 25 pages.
Chaurasia, G. et al., Depth Synthesis and Local Warps for Plausible Image-Based Navigation, ACM Transactions on Graphics (TOG), 2013, 32(3):1-12.
Chen, W. et al., Single-Image Depth Perception in the Wild, 30th Conference on Neural Information Processing Systems, NIPS, 2016, pp. 1-9.
Chen, W. et al., Learning to Predict 3D Objects with an Interpolation-Based Differentiable Renderer, 33rd Conference on Neural Information Processing Systems (NeurIPS), 2019, pp. 1-11.
Chen, A. et al., MVSNeRF: Fast Generalizable Radiance Field Reconstruction from Multi-View Stereo, In Proceedings of the IEEE/CVF International Conference on Computer Vision, 2021, pp. 14124-14133.
Choi, I. et al., Extreme View Synthesis, In Proceedings of the IEEE/CVF International Conference on Computer Vision, 2019, pp. 7781-7790.
Dai, A. et al., ScanNet: Richly-Annotated 3D Reconstructions of Indoor Scenes, In Proceedings of the IEEE Conference on Computer Vision and Pattern Recognition, 2017, pp. 5828-5839.
Dai, Y. et al., MVS2: Deep Unsupervised Multi-View Stereo with Multi-View Symmetry, arXiv:1908.11526, 2019, 10 pages.
Debevec, P. et al., Modeling and Rendering Architecture from Photographs: A Hybrid Geometry- and Image-Based Approach, In Proceedings of the 23rd Annual Conference on Computer Graphics and Interactive Techniques, 1996, pp. 11-20.
Deng, K. et al., Depth-Supervised NeRF: Fewer Views and Faster Training for Free, arXiv:2107.02791, 2021, pp. 1-13.
Dosovitskiy, A. et al., An Image is Worth 16x16 Words: Transformers for Image Recognition at Scale, arXiv:2010.11929, 2021, pp. 1-22.
Garbin, S. et al., FastNeRF: High-Fidelity Neural Rendering at 200FPS, In Proceedings of the IEEE/CVF International Conference on Computer Vision, 2021, pp. 14346-14355.
Genova, K. et al., Local Deep Implicit Functions for 3D Shape, In Proceedings of the IEEE/CVF Conference on Computer Vision and Pattern Recognition, 2020, pp. 4857-4866.
Gortler, S. et al., The Lumigraph, In Proceedings of the 23rd Annual Conference on Computer Graphics and Interactive Techniques, 1996, pp. 43-54.
Guo, P. et al., Fast and Explicit Neural View Synthesis, arXiv:2107.05775, 2021, pp. 1-21.
Hani, N. et al., Continuous Object Representation Networks: Novel View Synthesis Without Target View Supervision, arXiv:2007.15627, 2020, 22 pages.
He, K. et al., Deep Residual Learning for Image Recognition, In Proceedings of the IEEE Conference on Computer Vision and Pattern Recognition, 2016, pp. 770-778.
Hedman, P. et al., Scalable Inside-Out Image-Based Rendering, ACM Transactions on Graphics (TOG), 2016, 35 (6):1-11.
Hedman, P. et al., Deep Blending for Free-Viewpoint Image-Based Rendering, ACM Transactions on Graphics (TOG), 2018, 37(6):1-15.
Hedman, P. et al., Instant 3D Photography, ACM Transactions on Graphics (TOG), 2018, 37(4):1-12.
Hedman, P. et al., Baking Neural Radiance Fields for Real-Time View Synthesis, In Proceedings of the IEEE/CVF International Conference on Computer Vision, 2021, pp. 5875-5884.
Hu, R. et al., Worldsheet: Wrapping the World in a 3D Sheet for View Synthesis from a Single Image, In Proceedings of the IEEE/CVF International Conference on Computer Vision, 2021, pp. 12528-12537.
Huang, P. et al., DeepMVS: Learning Multi-View Stereopsis, In Proceedings of the IEEE Conference on Computer Vision and Pattern Recognition, 2018, pp. 2821-2830.
Huang, R. et al., An LSTM Approach to Temporal 3D Object Detection in Lidar Point Clouds, arXiv:2007.12392, 2020, pp. 1-18.
Jain, A. et al., Putting NeRF on a Diet: Semantically Consistent Few-Shot View Synthesis, In Proceedings of the IEEE/CVF International Conference on Computer Vision, 2021, pp. 5885-5894.
Jatavallabhula, K. et al., Kaolin: A Pytorch Library for Accelerating 3D Deep Learning Research, arXiv:1911.05063, 2019, pp. 1-7.
Jensen, R. et al., Large Scale Multi-View Stereopsis Evaluation, In Proceedings of the IEEE Conference on Computer Vision and Pattern Recognition, 2014, pp. 406-413.
Jiang, C. et al., Local Implicit Grid Representations for 3D Scenes, In Proceedings of the IEEE/CVF Conference on Computer Vision and Pattern Recognition, 2020, pp. 6001-6010.
Jiang, Y. et al., SDFDiff: Differentiable Rendering of Signed Distance Fields for 3D Shape Optimization, In Proceedings of the IEEE/CVF Conference on Computer Vision and Pattern Recognition, 2020, pp. 1251-1261.
Karras, T. et al., Analyzing and Improving the Image Quality of StyleGAN, In Proceedings of the IEEE/CVF Conference on Computer Vision and Pattern Recognition, 2020, pp. 8110-8119.
Kingma, D. et al., Adam: A Method for Stochastic Optimization, arXiv:1412.6980, 2015, pp. 1-13.
Le, H. et al., Novel View Synthesis from Single Images via Point Cloud Transformation, arXiv:2009.08321, 2020, pp. 1-19.
Ledig, C. et al., Photo-Realistic Single Image Super-Resolution Using a Generative Adversarial Network, In Proceedings of the IEEE Conference on Computer Vision and Pattern Recognition, 2017, pp. 4681-4690.
Levoy, M. et al., Light Field Rendering, In Proceedings of the 23rd Annual Conference on Computer Graphics and Interactive Techniques, 1996, pp. 31-42.
Liu, S. et al., Soft Rasterizer: Differentiable Rendering for Unsupervised Single-View Mesh Reconstruction, arXiv:1901.05567, 2019, 10 pages.
Liu, S. et al., DIST: Rendering Deep Implicit Signed Distance Function with Differentiable Sphere Tracing, In Proceedings of the IEEE/CVF Conference on Computer Vision and Pattern Recognition, 2020, pp. 2019-2028.
Liu, A. et al., Infinite Nature: Perpetual View Generation of Natural Scenes from a Single Image, arXiv:2012.09855, 2021, 17 pages.
Liu, L. et al., Neural Sparse Voxel Fields, arXiv:2007.11571, 2021, pp. 1-22.
Lombardi, S. et al., Neural vols. Learning Dynamic Renderable vols. from Images, arXiv:1906.07751, 2019, pp. 1-14.
Luo, X. et al., Consistent Video Depth Estimation, ACM Transactions on Graphics (TOG), 2020, vol. 39, No. 4, Article 71, pp. 1-13.
Martin-Brualla, R. et al., NeRF in the Wild: Neural Radiance Fields for Unconstrained Photo Collections, In Proceedings of the IEEE/CVF Conference on Computer Vision and Pattern Recognition, 2021, pp. 7210-7219.
Mescheder, L. et al., Occupancy Networks: Learning 3D Reconstruction in Function Space, In Proceedings of the IEEE/CVF Conference on Computer Vision and Pattern Recognition, 2019, pp. 4460-4470.
Mildenhall, B. et al., NeRF: Representing Scenes as Neural Radiance Fields for View Synthesis, Communications of the ACM, 2022, 65(1):99-106.
Najibi, M. et al., DOPS: Learning to Detect 3D Objects and Predict their 3D Shapes, In Proceedings of the IEEE/CVF Conference on Computer Vision and Pattern Recognition, 2020, pp. 11913-11922.
Neff, T. et al., DONeRF: Towards Real-Time Rendering of Compact Neural Radiance Fields using Depth Oracle Networks, Eurographics Symposium on Rendering, 2021, 40(4):45-59.
Niemeyer, M. et al., Differentiable Volumetric Rendering: Learning Implicit 3D Representations without 3D Supervision, In Proceed-

(56) References Cited

OTHER PUBLICATIONS ings of the IEEE/CVF Conference on Computer Vision and Pattern Recognition, 2020, pp. 3504-3515.

Novotny, D. et al., PerspectiveNet: A Scene-Consistent Image Generator for New View Synthesis in Real Indoor Environments, Advances in Neural Information Processing Systems, 2019, 32:7601-7612.

Park, J. et al., DeepSDF: Learning Continuous Signed Distance Functions for Shape Representation, In Proceedings of the IEEE/CVF Conference on Computer Vision and Pattern Recognition, 2019, pp. 165-174.

Park, K. et al., Nerfies: Deformable Neural Radiance Fields, arXiv:2011.12948, 2021, pp. 1-18.

Penner, E. et al., Soft 3D Reconstruction for View Synthesis, ACM Transactions on Graphics (TOG), 2017, vol. 36, No. 6, Article 235, pp. 1-11.

Ravi, N. et al., Accelerating 3D Deep Learning with PyTorch3D, arXiv:2007.08501, 2020, pp. 1-18.

Riegler, G. et al., Free View Synthesis, arXiv:2008.05511, 2020, pp. 1-17.

Riegler, G. et al., Stable View Synthesis, In Proceedings of the IEEE/CVF Conference on Computer Vision and Pattern Recognition, 2021, pp. 12216-12225.

Rockwell, C. et al., PixelSynth: Generating a 3D-Consistent Experience from a Single Image, In Proceedings of the IEEE/CVF International Conference on Computer Vision, 2021, pp. 14104-14113.

Rombach, R. et al., Geometry-Free View Synthesis: Transformers and No. 3D Priors, In Proceedings of the IEEE/CVF International Conference on Computer Vision, 2021, pp. 14356-14366.

Rosu, R. et al., NeuralMVS: Bridging Multi-View Stereo and Novel View Synthesis, arXiv:2108:03880, 2021, pp. 1-9.

Schonberger, J. et al., Pixelwise View Selection for Unstructured Multi-View Stereo, In Computer Vision—ECCV 2016: 14th European Conference, 2016, pp. 501-518.

Shih, M. et al., 3D Photography Using Context-Aware Layered Depth Inpainting, In Proceedings of the IEEE/CVF Conference on Computer Vision and Pattern Recognition, 2020, pp. 8028-8038.

Silberman, N. et al., Indoor Segmentation and Support Inference from RGBD Images, In Computer Vision—ECCV 2012: 12th European Conference on Computer Vision, 2012, pp. 746-760.

Sitzmann, V. et al., DeepVoxels: Learning Persistent 3D Feature Embeddings, In Proceedings of the IEEE/CVF Conference on Computer Vision and Pattern Recognition, 2019, pp. 2437-2446.

Sitzmann, V. et al., Scene Representation Networks: Continuous 3D-Structure-Aware Neural Scene Representations, 33rd Conference on Neural Information Processing Systems, 2019, pp. 1-12.

Song, S. et al., SUN RGB-D: A RGB-D Scene Understanding Benchmark Suite, In Proceedings of the IEEE Conference on Computer Vision and Pattern Recognition, 2015, pp. 567-576.

Song, Z. et al., Deep Novel View Synthesis from Colored 3D Point Clouds, ECCV 2020, LNCS 12369, pp. 1-17.

Srinivasan, P. et al., Pushing the Boundaries of View Extrapolation with Multiplane Images, In Proceedings of the IEEE/CVF Conference on Computer Vision and Pattern Recognition, 2019, pp. 175-184.

Stelzner, K. et al., Decomposing 3D Scenes into Objects via Unsupervised vol. Segmentation, arXiv:2104.01148, 2021, pp. 1-15.

Tatarchenko, M. et al., Multi-View 3D Models from Single Images with a Convolutional Network, ECCV 2016, Part VII, LNCS 9911, 2016, pp. 322-337.

Trevithick, A. et al., GRF: Learning a General Radiance Field for 3D Scene Representation and Rendering, arXiv:2010.04595, 2020, pp. 1-23.

Vaswani, A. et al., Attention Is All You Need, 31st Conference on Neural Information Processing Systems, 2017, pp. 1-11.

Wang, Z. et al., Image Quality Assessment: From Error Visibility to Structural Similarity, IEEE Transactions on Image Processing, 2004, 13(4):600-612.

Wang, T. et al., High-Resolution Image Synthesis and Semantic Manipulation with Conditional GANs, In Proceedings of the IEEE Conference on Computer Vision and Pattern Recognition, 2018, pp. 8798-8807.

Wang, F. et al., PatchmatchNet: Learned Multi-View Patchmatch Stereo, arXiv:2012.01411, 2020, pp. 1-16.

Wang, Q. et al., IBRNet: Learning Multi-View Image-Based Rendering, arXiv:2102.13090, 2021, pp. 1-10.

Wang, Z. et al., NeRF—: Neural Radiance Fields Without Known Camera Parameters, arXiv:2102.07064, 2022, pp. 1-17.

Wiles, O. et al., SynSin: End-to-End View Synthesis from a Single Image, In Proceedings of the IEEE/CVF Conference on Computer Vision and Pattern Recognition, 2020, pp. 7467-7477.

Wizadwongsa, S. et al., NeX: Real-time View Synthesis with Neural Basis Expansion, arXiv:2103.05606, 2021, pp. 1-14.

Xian, W. et al., Space-Time Neural Irradiance Fields for Free-Viewpoint Video, In Proceedings of the IEEE/CVF Conference on Computer Vision and Pattern Recognition, 2021, pp. 9421-9431.

Yang, C. et al., High-Resolution Image Inpainting Using Multi-Scale Neural Patch Synthesis, In Proceedings of the IEEE Conference on Computer Vision and Pattern Recognition, 2017, pp. 6721-6729.

Yao, Y. et al., MVSNet: Depth Inference for Unstructured Multi-View Stereo, In Proceedings of the European Conference on Computer Vision (ECCV), 2018, pp. 767-783.

Yu, A. et al., pixelNeRF: Neural Radiance Fields from One or Few Images, arXiv:2012.02190, 2020, pp. 1-20.

Yu, A., et al., PlenOctrees for Real-time Rendering of Neural Radiance Fields, arXiv:2103.14024, 2021, pp. 1-18.

Yu, J. et al., Generative Image Inpainting with Contextual Attention, In Proceedings of the IEEE Conference on Computer Vision and Pattern Recognition, 2018, pp. 5505-5514.

Zhang, R. et al., The Unreasonable Effectiveness of Deep Features as a Perceptual Metric, In Proceedings of the IEEE Conference on Computer Vision and Pattern Recognition, 2018, pp. 586-595.

Zhang, H. et al., Self-Attention Generative Adversarial Networks, In International Conference on Machine Learning, PMLR, 2019, pp. 7354-7363.

Zhang, K. et al., NeRF++: Analyzing and Improving Neural Radiance Fields, arXiv:2010.07492, 2020, pp. 1-9.

Zhou, T. et al., Stereo Magnification: Learning View Synthesis Using Multiplane Images, ACM Trans. Graph, 2018, vol. 37, No. 4, Article 65, pp. 1-12.

Zhu, J. et al., Unpaired Image-to-Image Translation Using Cycle-Consistent Adversarial Networks, In Proceedings of the IEEE International Conference on Computer Vision, 2017, pp. 2223-2232.

* cited by examiner

REAL-TIME NOVEL VIEW SYNTHESIS WITH FORWARD WARPING AND DEPTH

CROSS-REFERENCES TO RELATED APPLICATIONS

Not Applicable.

STATEMENT REGARDING FEDERALLY SPONSORED RESEARCH

Not Applicable.

BACKGROUND OF THE INVENTION

1. Field of the Invention

This invention relates to real-time novel view synthesis with forward warping and depth.

2. Description of the Related Art

Novel view synthesis (NVS) is a challenging task requiring systems to generate photorealistic images of scenes from new viewpoints, where both quality and speeds are desired for real applications. Previous image-based rendering (IBR) possesses fast rendering speeds but limited quality when input views are sparse. Recent Neural Radiance Fields (NeRF) and generalizable variants give impressive results but suffer extremely low speeds.

Therefore, there is a need for a fast and generalizable novel view synthesis method with sparse inputs.

SUMMARY OF THE INVENTION

In this disclosure, we provide a fast and generalizable novel view synthesis method with sparse inputs, which enjoys both high quality and fast running for synthesis. With explicit depth and differentiable rendering, the method achieves competitive quality with the state of the art NeRF-based methods with 140-1000× speed up. Moreover, it allows seamless integration of sensor depths to improve the synthesis quality significantly. With the growing prevalence of depths sensors, the method can contribute to real applications.

In one configuration, a method is provided for novel view synthesis. The method includes accessing a first input image with a first view of a subject in the first input image, and a second input image with a second view of the subject in the second input image using a computer system. The method also includes estimating depths for pixels in the at least first and second input images. The method also includes constructing a point cloud of image features from the estimated depths. The method also includes synthesizing a novel view by forward warping by using a point cloud rendering of the constructed point cloud.

In one configuration, a system is provided for novel view synthesis. The system includes a computer system configured to: i) access a first input image with a first view of a subject in the first input image, and a second input image with a second view of the subject in the second input image; ii) estimate depths for pixels in the at least first and second input images; iii) construct a point cloud of image features from the estimated depths; and iv) synthesize a novel view by forward warping by using a point cloud rendering of the constructed point cloud.

These and other features, aspects, and advantages of the present disclosure will become better understood upon consideration of the following detailed description, drawings, and appended claims.

DETAILED DESCRIPTION OF THE INVENTION

Figure 1:
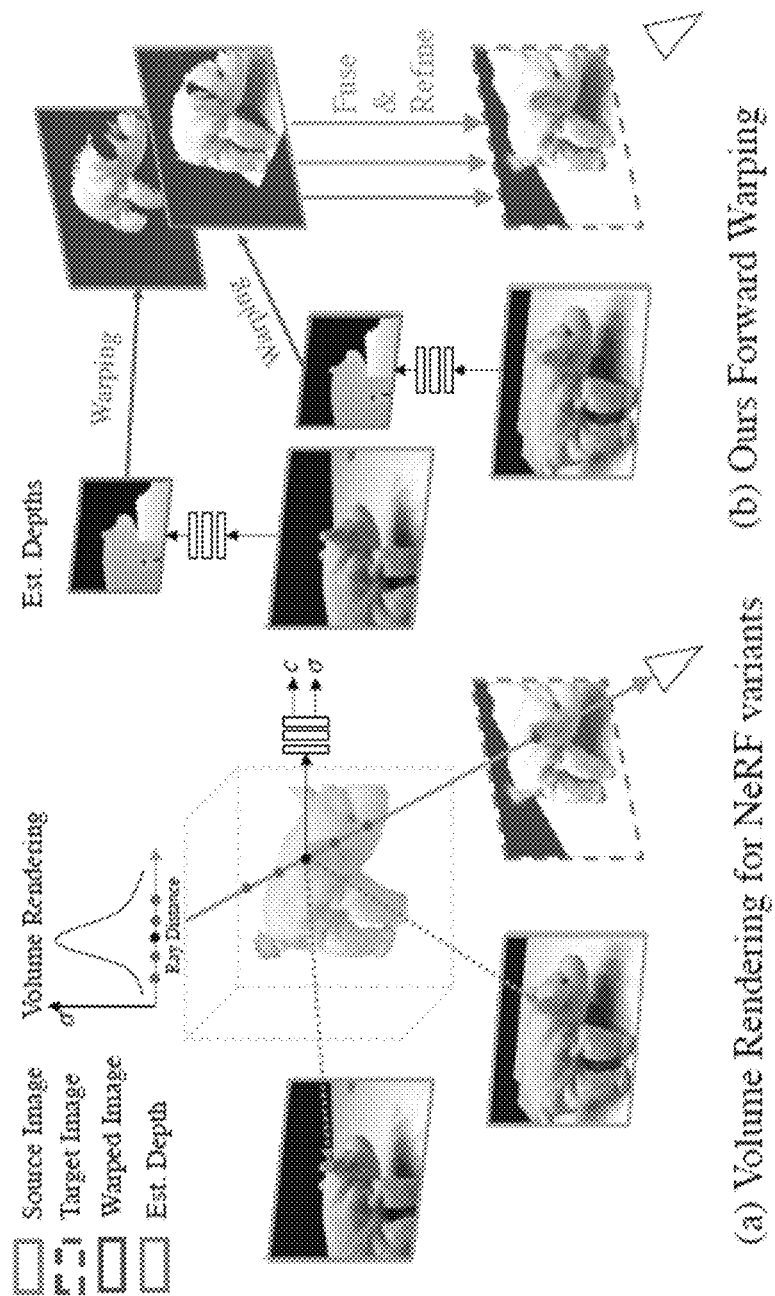
FIG. 1 shows real-time novel view synthesis. We present a real-time and generalizable method to synthesize images from sparse inputs. NeRF variants model the scene via a multilayer perceptron (MLP), which is queried millions of times during rendering and leads to low speeds. Our method utilizes explicit depths and point cloud renderers for fast rendering, inspired by IBR. The model is trained end-to-end with a novel fusion transformer to give high-quality results, where regressed depths and features are optimized for synthesis.

Before the present invention is described in further detail, it is to be understood that the invention is not limited to the particular embodiments described. It is also to be understood that the terminology used herein is for the purpose of describing particular embodiments only, and is not intended to be limiting. The scope of the present invention will be limited only by the claims. As used herein, the singular forms "a", "an", and "the" include plural embodiments unless the context clearly dictates otherwise.

It should be apparent to those skilled in the art that many additional modifications beside those already described are possible without departing from the inventive concepts. In interpreting this disclosure, all terms should be interpreted in the broadest possible manner consistent with the context. Variations of the term "comprising", "including", or "having" should be interpreted as referring to elements, components, or steps in a non-exclusive manner, so the referenced elements, components, or steps may be combined with other elements, components, or steps that are not expressly referenced. Embodiments referenced as "comprising", "including", or "having" certain elements are also contemplated as "consisting essentially of" and "consisting of" those elements, unless the context clearly dictates otherwise. It should be appreciated that aspects of the disclosure that are described with respect to a system are applicable to the methods, and vice versa, unless the context explicitly dictates otherwise.

The present invention provides systems and methods for fast and generalizable novel view synthesis (NVS) with sparse inputs, which enjoys both high quality and fast running for synthesis. (NVS) aims to generate photorealistic images depicting a scene or image from unseen viewpoints. Sparse inputs may include where a limited number of views of a scene are available, or where the angular difference between views is minimal, thus making a reproduction of the scene from a novel viewpoint challenging. With explicit depth and differentiable rendering, the systems and methods may achieve competitive quality with the state of the art Neural Radiance Fields (NeRF) based methods with significant speed up. Seamless integration of sensor depths may be provided to improve the synthesis quality.

Previous methods have required dense input views, such as a large number of views from different viewpoints, to produce good results. Some methods have shown excellent quality without per-scene optimization, but require intense computation leading to slow speeds.

In some configurations, the systems and methods in accordance with the present disclosure use Forward Warping features based on estimated Depths (FWD) to achieve high quality, fast results. Estimating explicit depth for input views can provide synthesis results with real-time speed. After estimating depths, a differentiable point cloud renderer may be used to project input images to a target view, which may provide for fast rendering speed and enabling end-to-end training. In some configurations, training may be performed with RGB data only. Training may be progressively enhanced if noisy sensor depth data is available during training or inference.

Figure 10:
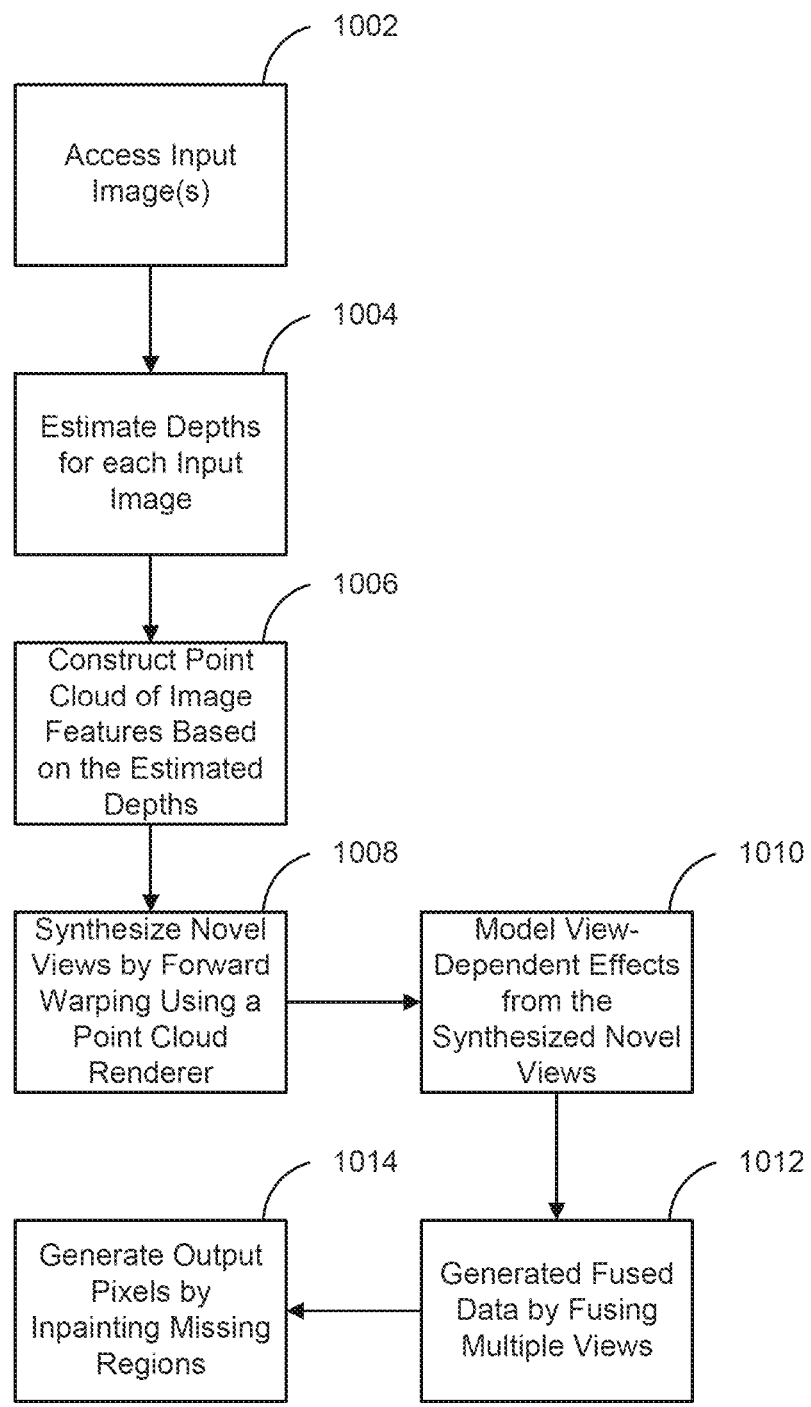
FIG. 10 shows a flowchart of non-limiting example steps for a method of novel view synthesis.

Referring to FIG. 10, a flowchart of non-limiting example steps for a method of novel view synthesis is shown. An input view or a number of input views may be accessed or acquired at step 1002. In some configurations, at least a first and second input view are used. Depths may be estimated for each input image at step 1004. Explicit depths may be in the form of 3D representations, which may provide for using sensor depths as additional inputs for better quality. Explicit depth may provide for fast and high-quality NVS.

A point cloud of image features may be constructed at step 1006 based on the estimated depths. Forward warping may be used to synthesize novel views at step 1008 using a point cloud renderer. View-dependent effects, such as missing pixel data, for the synthesized novel views may be modeled at step 1010. In some configurations, the view-dependent effects may be modeled using a feature-dependent MLP operating on estimated point clouds. Addressing view-dependent effects, such as missing regions or pixel data, may be performed with image fusion of the synthesized novel views and inpainting the missing data. Fused data may be generated by fusing multiple synthesized views at step 1012. In some configurations, fused data may be generated using a Transformer-based fusion module. Missing regions may be in-painted to generate output pixels at step 1014, such as by using a refinement module. In some configurations, a model may be trained end-to-end to minimize photometric and perceptual losses, which may provide for learning depth and features optimized for synthesis quality.

In some configurations, a sparse set of input images may be represented by $\{I_i\}_{i=1}^{N}$ and corresponding camera poses $\{Ri, Ti\}$. A novel view with camera pose $\{Rt, Tt\}$ may be synthesized. The depths $\{D_i^{sen}\}$ of $I_i$ may be estimated, or may be optionally captured from sensors. Using explicit depths and forward warping may provide for real-time rendering speed and tremendous accelerations. In some configurations, quality degradations caused by inaccurate depth estimations may be mitigated by using a differentiable renderer, fusion & refinement modules, and encouraging the model to learn geometry and features optimized for synthesis quality.

In some configurations for estimating depths, input view $I_i$ may be converted to a 3D point cloud $P_i$ containing geometry and view-dependent semantics of the view. View-dependent semantics may include the angle of the view to the subject in the scene, pixel values in the scene, and the like. A differentiable neural point cloud renderer $\pi$ may be used to project point clouds to target viewpoints. Rather than directly aggregating point clouds across views before rendering, a Transformer-based module T may be used for fusing rendered results at a target view. A refinement module R may be employed to generate final outputs. The whole model may be trained end-to-end with photometric and perceptual loss.

Point cloud construction may include using an explicit 3D representation to inject 3D priors into a model. Point clouds may be used to represent scenes due to their efficiency, compact memory usage, and scalability to complex scenes. For input view a point cloud $P_i$ may be constructed by estimating per-pixel depth $D_i$ and per-pixel feature vectors $F_i'$ at the same resolution as the input image, then projecting the feature vectors into 3D space using known camera intrinsics. The depth $D_i$ may be estimated by a depth network d, giving 3D scene structure; features $F_i'$ may be computed by a spatial feature encoder f and view-dependent MLP ψ representing scene semantics.

In a non-limiting example of a spatial feature encoder f, scene semantics of input view $I_i$ are mapped to pixel-specific feature vectors $F_i$ by spatial feature encoder f. Each feature vector in $F_i$ may include a determined number of dimensions and may be concatenated with RGB channels.

In a non-limiting example of depth network d, depth may be estimated from a single image, but using a single image may introduce scaling/shifting ambiguity, losing valuable multi-view cues and leading to inconsistent estimations across views. Applying conventional multi-view stereo algorithms (MVS) solely on sparse inputs is challenging because of limited overlap and huge baselines between input views, leading to inaccurate and low-confidence estimations. In some configurations, cascading a U-Net after the MVS module may address these challenges. The U-Net takes image $I_i$ and estimates depths from the MVS module as inputs, refining depths with multiview stereo cues and image cues.

In some configurations, depth estimation may include sensor depths. A U-Net may receive an initial depth estimation from an MVS module and may output a refined depth used to build the point cloud. If sensor depth $D_i^{sen}$ is available, it may be directly input to the U-Net as the initial depth estimations. A U-Net may serve as a completion and refinement module taking $D_i^{sen}$ and $I_i$ as inputs, since $D_i^{sen}$ is usually noisy and incomplete. During training, loss $L_s$ may be employed to encourage the U-Net output to match the sensor depth, as determined by eq. (1) below.

For a view-dependent feature MLP ψ, the appearance of the same object may vary across views, such as because of lighting and view direction changes introducing inconsistency between multiple views. The scene semantics may be represented by spatial features $F_i$ and translated to the target view for synthesis. View direction changes from input to target views may be inserted into scene semantics to model the view-dependent effects. An MLP ψ may be used to compute view-dependent spatial features $F_i$ by taking $F_i$ and relative view changes $\Delta_v$ as inputs. For each point in the cloud, $\Delta_v$ may be calculated based on normalized view directions $v_i$ and $v_t$, from the point to camera centers of input view i and target view t. The relative view direction change may be determined by eq. (2) below, and view-dependent feature $F_i'$ may be determined by eq. (3) below.

In some configurations for a point cloud renderer, after constructing a point cloud $P_i$ from view i containing the geometry and semantics of the scene, $P_i$ may be viewed at target views for synthesis. A neural point cloud π may be used. $P_i$ may be first transformed to target view coordinates based on relative camera poses and then rendered by π. The rendered results ~$F_i$ may be spatial feature maps, sharing the same dimension as feature $F_i'$ in $P_i$ at each pixel. With explicit geometry transformation and renderer satisfying geometry rules, rendered results may be geometrically consistent and correct across views. A renderer may provide for assigning points to a region and accumulate them based on blending weights for each pixel. The weight may be computed based on depth, distance to rays cast from the pixel, sphere radius, and the like.

A fully differentiable renderer may be used and may provide for a model to be trained end-to-end, where photometric and perceptual loss gradients can be propagated to points' position and features. The model may be trained to learn to estimate depths and features optimized for synthesis quality.

The point clouds constructed from each input view for synthesis may be fused to generate fused data. Each point cloud may be rendered individually at the target viewpoint and the rendered results may be fused to form fused data. A Transformer-based fusion module T may be used to fuse arbitrary size inputs and a refinement module R may be used to synthesize final results based on fused features.

In some configurations of fusion Transformer T, a set of feature maps $\{\tilde{F}_i\}$ may be rendered from point clouds and fused into one feature map, which may be decoded into an RGB image by a refinement module. The fusion operation may consider scene semantics, be fast, and may support an arbitrary number of inputs in any order. A pixel-wise Transformer T may be used for fusion. T extracts feature vectors from $\{\tilde{F}i\}$ as inputs and output a fused one at each pixel. A standard multi-head attention may be applied to the sequence of feature vectors and queries using an extra learnable "token". Applied on features, T may utilize scene semantics for fusion. Depths at a target view may be rendered for each point cloud and the relative view changes may be determined from input to target views. These may be concatenated as geometry features and used as position encoding of the Transformer.

In some configurations of refinement Module R, fused feature maps $\tilde{F}$ may be decoded to RGB images $\tilde{I}$ at target view. Regions not visible in the input views may be inpainted to be semantically meaningful and geometrically accurate. Inpainting to be semantically meaningful may include missing portions of a feature or object in an image, such as a couch, should be filled in with similar texture. Inpainting to be geometrically accurate may include where a feature or an object that has straight lines should continue to be straight. In some configurations, inpainting includes assigning pixel values to missing pixel data based upon interpolating between nearest neighbor pixel regions, by incorporating pixel data from similar novel views or regions in the image, performing pixel weighting, and the like. Local errors caused by inaccurate depths may be corrected and perceptual quality may be improved based on semantics contained by feature maps, leading to coherent and high-quality synthesis.

Training of a model may be performed end-to-end with photometric $\mathcal{L}_{l2\ l2}$ and perceptual $\mathcal{L}_{c\ c}$ losses between generated and ground-truth target images. The whole loss function may be determined by eq. (4) below. The model may be trained for a period of time, such as over a period of days, and may include using GPUs.

In some configurations, the effectiveness of the novel view synthesis may be determined, such as by using a ShapeNet or DTU benchmark, and the like, and comparing the results with representative NeRF-variants and IBR methods. Novel view synthesis in accordance with the present disclosure may outperform existing methods, considering both speed and quality.

Figure 11:
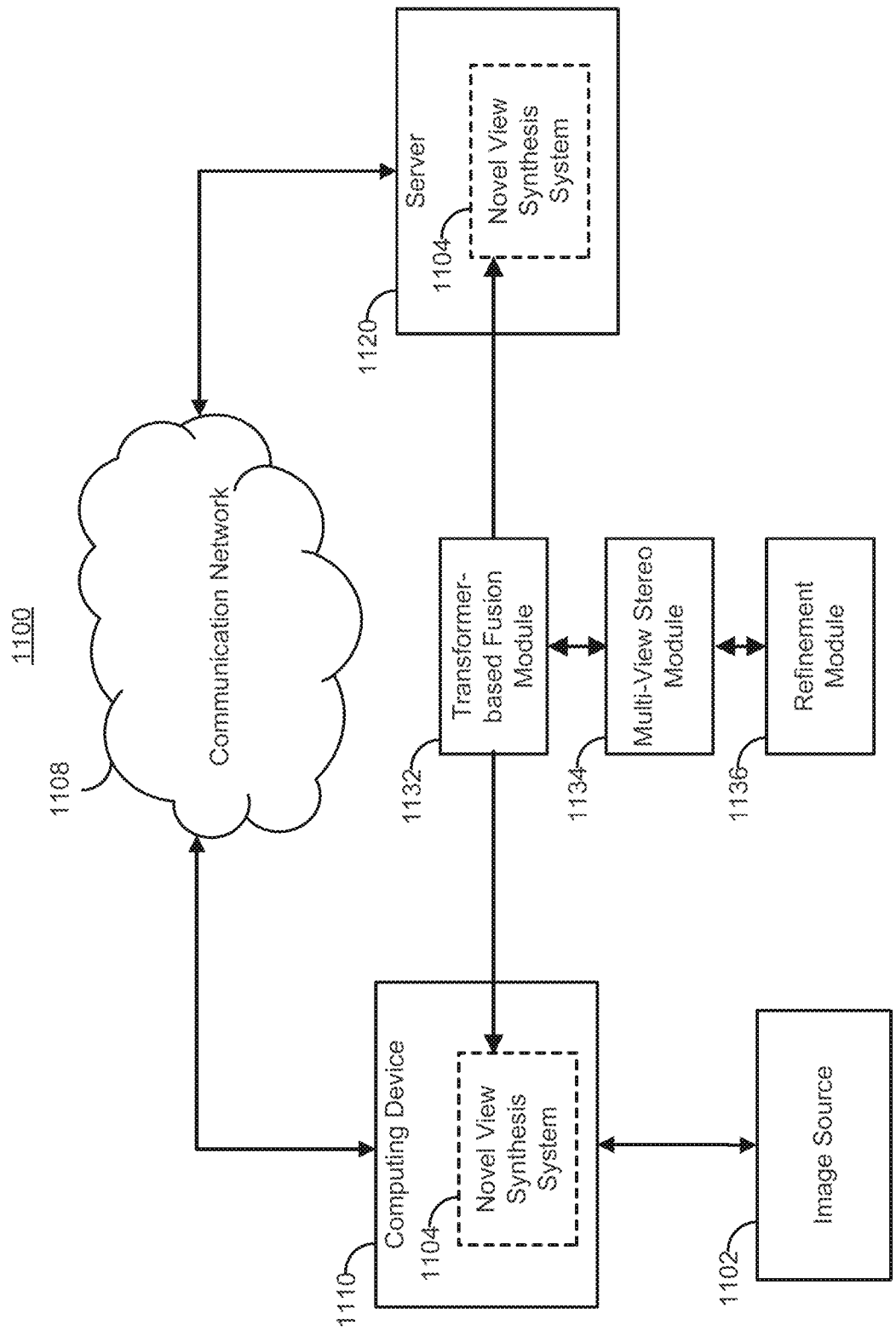
FIG. 11 shows a block diagram of a non-limiting example system for automatically performing novel view synthesis.

FIG. 11 shows an example 1100 of a system for automatically performing novel view synthesis using input image data in accordance with some embodiments of the disclosed subject matter. As shown in FIG. 11, a computing device 1110 can receive multiple images or multiple types of image data from an image source 1102. In some configurations, computing device 1110 can execute at least a portion of an automatic novel view synthesis system 1104 to automatically novel view synthesis based on input images. Novel view synthesis system 1104 may include a transformer-based fusion module 1132, multi-view stereo module 1134, and refinement module 1136.

Additionally or alternatively, in some embodiments, computing device 1110 can communicate information about image data received from image source 1102 to a server 1120 over a communication network 1108, which can execute at least a portion of automatic novel view synthesis system 1104 to automatically generate novel views. In such embodiments, server 1120 can return information to computing device 1110 (and/or any other suitable computing device) indicative of an output of automatic novel view synthesis system 1104 to generate novel views.

In some embodiments, computing device 1110 and/or server 1120 can be any suitable computing device or combination of devices, such as a desktop computer, a laptop computer, a smartphone, a tablet computer, a wearable computer, a server computer, a virtual machine being executed by a physical computing device, etc. In some configurations, automatic novel view synthesis system 1104 can generate novel views from input image data using a model trained by a neural network, such as a convolutional neural network (CNN). In some embodiments, training image data can be used to train a model, such as a support vector machine (SVM), to inpaint missing image features in the novel view. In some embodiments, automatic novel view synthesis system 1104 can provide input image data to the trained model and can present a novel view synthesis based on the output of the model.

In some embodiments, image source 1102 can be any suitable source of image data, such as a camera system, a vehicle camera system, or another computing device (e.g., a server storing image data), etc. In some embodiments, image source 1102 can be local to computing device 1110. For example, image source 1102 can be incorporated with computing device 1110 (e.g., computing device 1110 can be configured as part of a device for capturing and/or storing images). As another example, image source 1102 can be connected to computing device 1110 by a cable, a direct wireless link, etc. Additionally or alternatively, in some embodiments, image source 1102 can be located locally and/or remotely from computing device 1110, and can communicate image data to computing device 1110 (and/or server 1120) via a communication network (e.g., communication network 1108).

In some embodiments, communication network 1108 can be any suitable communication network or combination of communication networks. For example, communication network 1108 can include a Wi-Fi network (which can include one or more wireless routers, one or more switches, etc.), a peer-to-peer network (e.g., a Bluetooth network), a cellular network (e.g., a 3G network, a 4G network, etc., complying with any suitable standard, such as CDMA, GSM, LTE, LTE Advanced, WiMAX, etc.), a wired network, etc. In some embodiments, communication network 1108 can be a local area network, a wide area network, a public network (e.g., the Internet), a private or semi-private network (e.g., a corporate or university intranet), any other suitable type of network, or any suitable combination of networks. Communications links shown in FIG. 11 can each be any suitable communications link or combination of communications links, such as wired links, fiber optic links, Wi-Fi links, Bluetooth links, cellular links, etc.

Figure 12:
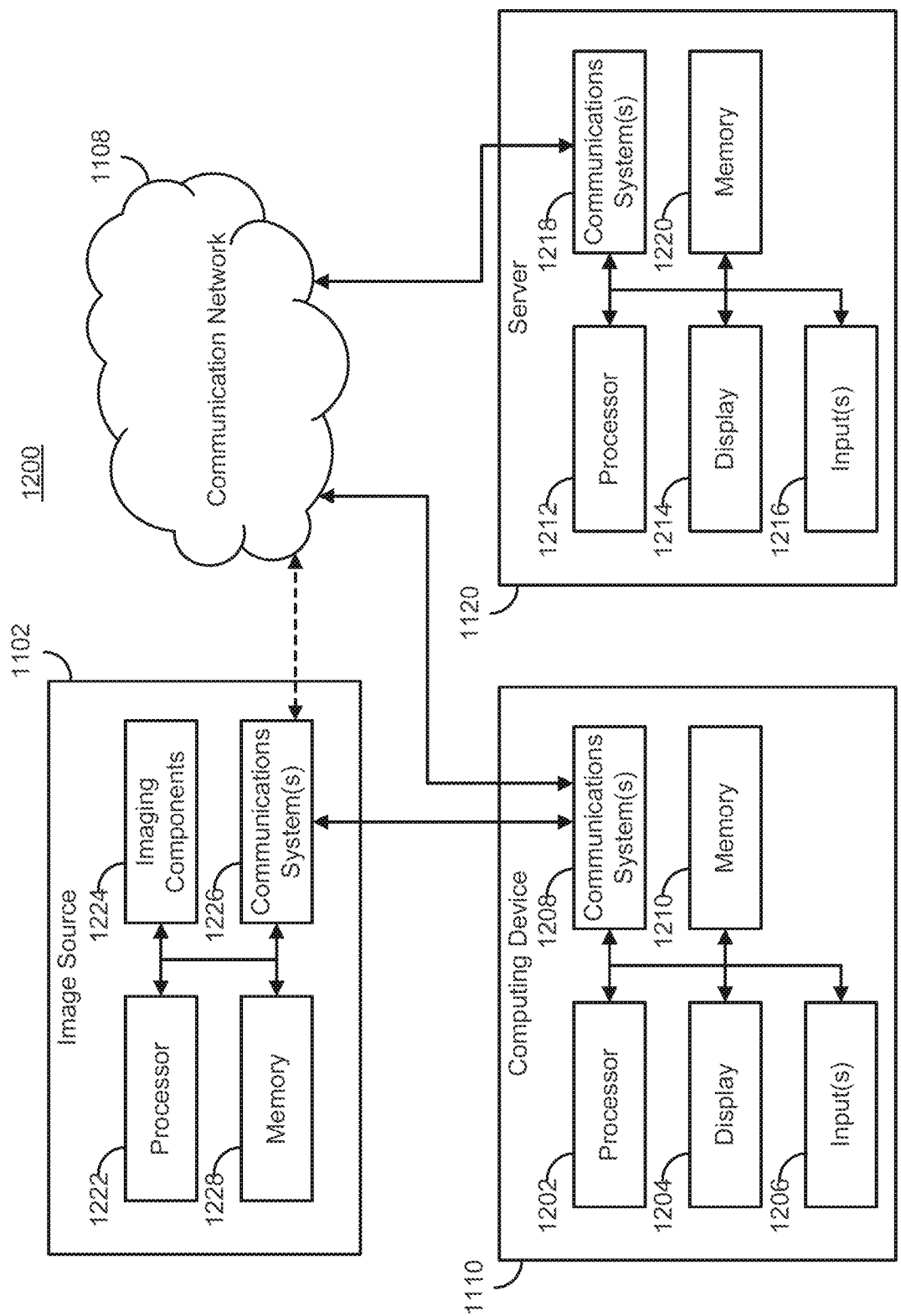
FIG. 12 shows a block diagram of non-limiting example hardware that can be used to implement the system of FIG. 11.

FIG. 12 shows an example 1200 of hardware that can be used to implement image source 1102, computing device 1110, and/or server 1120 in accordance with some embodiments of the disclosed subject matter. As shown in FIG. 12, in some embodiments, computing device 1110 can include a processor 1202, a display 1204, one or more inputs 1206, one or more communication systems 1208, and/or memory 1210. In some embodiments, processor 1202 can be any suitable hardware processor or combination of processors, such as a central processing unit (CPU), a graphics processing unit (GPU), etc. In some embodiments, display 1204 can include any suitable display devices, such as a computer monitor, a touchscreen, a television, etc. In some embodiments, inputs 1206 can include any suitable input devices and/or sensors that can be used to receive user input, such as a keyboard, a mouse, a touchscreen, a microphone, etc.

In some embodiments, communications systems 1208 can include any suitable hardware, firmware, and/or software for communicating information over communication network 1108 and/or any other suitable communication networks. For example, communications systems 1208 can include one or more transceivers, one or more communication chips and/or chip sets, etc. In a more particular example, communications systems 1208 can include hardware, firmware and/or software that can be used to establish a Wi-Fi connection, a Bluetooth connection, a cellular connection, an Ethernet connection, etc.

In some embodiments, memory 1210 can include any suitable storage device or devices that can be used to store instructions, values, etc., that can be used, for example, by processor 1202 to present content using display 1204, to communicate with server 1120 via communications system(s) 1208, etc. Memory 1210 can include any suitable volatile memory, non-volatile memory, storage, or any suitable combination thereof. For example, memory 1210 can include RAM, ROM, EEPROM, one or more flash drives, one or more hard disks, one or more solid state drives, one or more optical drives, etc. In some embodiments, memory 1210 can have encoded thereon a computer program for controlling operation of computing device 1110. In such embodiments, processor 1202 can execute at least a portion of the computer program to present content (e.g., camera 2D images, 3D images, user interfaces, graphics, tables, etc.), receive content from server 1120, transmit information to server 1120, etc.

In some embodiments, server 1120 can include a processor 1212, a display 1214, one or more inputs 1216, one or more communications systems 1218, and/or memory 1220. In some embodiments, processor 1212 can be any suitable hardware processor or combination of processors, such as a CPU, a GPU, etc. In some embodiments, display 1214 can include any suitable display devices, such as a computer monitor, a touchscreen, a television, etc. In some embodiments, inputs 1216 can include any suitable input devices and/or sensors that can be used to receive user input, such as a keyboard, a mouse, a touchscreen, a microphone, etc.

In some embodiments, communications systems 1218 can include any suitable hardware, firmware, and/or software for communicating information over communication network 1108 and/or any other suitable communication networks. For example, communications systems 1218 can include one or more transceivers, one or more communication chips and/or chip sets, etc. In a more particular example, communications systems 1218 can include hardware, firmware and/or software that can be used to establish a Wi-Fi connection, a Bluetooth connection, a cellular connection, an Ethernet connection, etc.

In some embodiments, memory 1220 can include any suitable storage device or devices that can be used to store instructions, values, etc., that can be used, for example, by processor 1212 to present content using display 1214, to communicate with one or more computing devices 1110, etc. Memory 1220 can include any suitable volatile memory, non-volatile memory, storage, or any suitable combination thereof. For example, memory 1220 can include RAM, ROM, EEPROM, one or more flash drives, one or more hard disks, one or more solid state drives, one or more optical drives, etc. In some embodiments, memory 1220 can have encoded thereon a server program for controlling operation of server 1120. In such embodiments, processor 1212 can execute at least a portion of the server program to transmit information and/or content (e.g., image data, a user interface, etc.) to one or more computing devices 1110, receive information and/or content from one or more computing devices 1110, receive instructions from one or more devices (e.g., a personal computer, a laptop computer, a tablet computer, a smartphone, etc.), etc.

In some embodiments, image source 1102 can include a processor 1222, imaging components 1224, one or more communications systems 1226, and/or memory 1228. In some embodiments, processor 1222 can be any suitable hardware processor or combination of processors, such as a CPU, a GPU, etc. In some embodiments, imaging components 1224 can be any suitable components to generate image data.

Note that, although not shown, image source 1102 can include any suitable inputs and/or outputs. For example, image source 1102 can include a storage device, such as an SD card, thumb drive, and the like, or input devices and/or sensors that can be used to receive user input, such as a keyboard, a mouse, a touchscreen, a microphone, a trackpad, a trackball, hardware buttons, software buttons, etc. As another example, image source 1102 can include any suitable display devices, such as a computer monitor, a touchscreen, a television, etc., one or more speakers, etc.

In some embodiments, communications systems 1226 can include any suitable hardware, firmware, and/or software for communicating information to computing device 1110 (and, in some embodiments, over communication network 1108 and/or any other suitable communication networks). For example, communications systems 1226 can include one or more transceivers, one or more communication chips and/or chip sets, etc. In a more particular example, communications systems 1226 can include hardware, firmware and/or software that can be used to establish a wired connection using any suitable port and/or communication standard (e.g., VGA, DVI video, USB, RS-232, etc.), Wi-Fi connection, a Bluetooth connection, a cellular connection, an Ethernet connection, etc.

In some embodiments, memory 1228 can include any suitable storage device or devices that can be used to store instructions, values, image data, etc., that can be used, for example, by processor 1222 to: control imaging components 1224, and/or receive image data from imaging components 1224; generate images; present content (e.g., images, a user interface, etc.) using a display; communicate with one or more computing devices 1110; etc. Memory 1228 can include any suitable volatile memory, non-volatile memory, storage, or any suitable combination thereof. For example, memory 1228 can include RAM, ROM, EEPROM, one or more flash drives, one or more hard disks, one or more solid state drives, one or more optical drives, etc. In some embodiments, memory 1228 can have encoded thereon a program for controlling operation of image source 1102. In such embodiments, processor 1222 can execute at least a portion of the program to generate images, transmit information and/or content (e.g., image data) to one or more computing devices 1110, receive information and/or content from one or more computing devices 1110, receive instructions from one or more devices (e.g., a personal computer, a laptop computer, a tablet computer, a smartphone, etc.), etc.

Example

The following Example is provided in order to demonstrate and further illustrate certain embodiments and aspects of the present invention and is not to be construed as limiting the scope of the invention.

Novel view synthesis (NVS) is a challenging task requiring systems to generate photorealistic images of scenes from new viewpoints, where both quality and speeds are desired for real applications. Previous image-based rendering (IBR) possesses fast rendering speeds but limited quality when input views are sparse. Recent Neural Radiance Fields (NeRF) and generalizable variants give impressive results but suffer extremely low speeds. In this Example, we describe a fast and generalizable NVS method with sparse inputs, called FWD-U, which enjoys both high quality and fast running for synthesis. With explicit depth and differentiable rendering, it achieves competitive quality with the state of the art NeRF-based methods with 140-1000× speed up. Moreover, it allows seamless integration of sensor depths to improve the synthesis quality significantly. With the growing prevalence of depth sensors, our method can contribute to real applications.

1. INTRODUCTION

Given several posed images, novel view synthesis (NVS) aims to generate photorealistic images depicting the scene from unseen viewpoints. This long-standing task has applications in graphics, VR/AR, bringing life to still images. It requires a deep visual understanding of geometry and semantics, making it appealing to test visual understanding.

Early work on NVS focused on image-based rendering (IBR), where models learn to blend a set of reference images for novel views. They typically construct light field [Ref. 37] or proxy geometry (like mesh surfaces) [Ref. 10, 22, 56, 57] from posed inputs and synthesize target views by resampling or blending warped source views. These methods tend to require many input images that densely cover the scene, and are limited by 3D reconstruction performance. They can have artifacts caused by low-quality geometry estimates, and tend to perform poorly for sparse input images.

Recently, Neural Radiance Fields (NeRF) [Ref. 46] have become a leading methods for NVS. They use an MLP to implicitly represent the 5D radiance field of the scene, and query the color and density of every sampled point from this network. A volumetric renderer aggregates sampled points along rays to give pixel colors. With many sampled points and a differentiable renderer, they don't need explicit geometry and learn densities optimized for synthesis quality. Despite impressive results, they are not generalizable, fitting a separate MLP for each scene with dense view images. Finally, they are slow since generating images requires querying the learned MLP tremendously many times.

Following works like PixelNeRF [Ref. 82], IBRNet [Ref. 72] and MVSNeRF [Ref. 7] emerged as generalizable NeRF variants, which generate views of unseen scenes without per-scene optimization by modeling MLPs conditioned on sparse input views. However, they still query the MLP millions of times, leading to slow speed. Thus, despite the progress of accelerating NeRF with per-scene optimization, fast and generalizable NeRF variants are still under-explored.

Our Example targets a generalizable NVS method with sparse inputs, having both real-time speed and high-quality results. Classical IBR methods possess are fast but require dense input views for good results. Generalizable NeRF variants show excellent quality without per-scene optimization, but require intense computation leading to slow speeds. Our method, termed FWD, achieves this target by Forward Warping features based on estimated Depths.

Our key insight is that estimating explicit depth for input views can give impressive synthesis results with real-time speed. After estimating depths, we use a differentiable point cloud renderer to project input images to a target view; this gives fast rendering speed and enables end-to-end-training.

Like prior NVS methods our approach can be trained with RGB data only, but it can be progressively enhanced if noisy sensor depth data is available during training or inference. Depth sensors are becoming more prevalent in consumer devices such as the iPhone 13 Pro and the LG G8 ThinQ, making RGB-D data more accessible than ever. For this reason, we believe that methods making use of RGB-D will become increasingly useful over time.

Our method estimates depths for each input view to build a point cloud of image features, then synthesizes novel views via a point cloud renderer. We model view-dependent effects with a feature-dependent MLP operating on estimated point clouds. We fuse data from multiple input views with a novel Transformer-based fusion module, then use a refinement module to inpaint missing regions and generate output pixels. The whole model is trained end-to-end to minimize photometric and perceptual losses, learning depth and features optimized for synthesis quality.

We validate the effectiveness of our method on the ShapeNet and DTU benchmarks, comparing it with representative NeRF-variants and IBR methods. It significantly outperforms existing methods, considering both speed and quality: compared to IBR methods we improve both speed and quality; compared to recent NeRF-based methods we achieve competitive quality at real-time speeds (140-1000× speedup). A user study demonstrates that our method gives the most perceptually pleasing results among all methods. Some main contributions are:

- We propose a generalizable and end-to-end NVS method with sparse inputs, which gives high-quality synthesis at a real-time speed. It outperforms existing methods significantly for speed and quality.
- We show that explicit depth is sufficient to give fast and high-quality NVS, and is easy to integrate sensor depths for better results. Experiments study performance across different depth availabilities.
- We propose a novel Transformer-based fusion module and introduce a view-dependent MLP into point cloud, significantly improving synthesis quality.

2. RELATED WORK

Novel view synthesis is a long-standing problem in computer vision, allowing for the generation of novel views given several scene images. A variety of 3D representations (both implicit and explicit) have been used for NVS, including depth and multi-plane images [Ref. 68, 87, 66, 54, 6, 61], voxels [Ref. 63, 19], meshes [Ref. 56, 21, 26, 57], point clouds [Ref. 76, 38, 58] and neural scene representations [Ref. 59, 39, 17, 32, 45, 52, 46]. In this Example, we use point clouds for computational and memory efficiency.

Image-based Rendering. IBR synthesizes novel views from a set of reference images by weighted blending [Ref. 13, 37, 18, 22, 54, 56, 10, 57]. They generally estimate proxy geometry from dense captured images for synthesis. For instance, Riegler et al. [Ref. 56] uses multi-view stereo [Ref. 60, 80, 71, 71, 43, 27] to produce scene mesh surface and warps source view images to target views based on proxy geometry. Despite promising results in some cases, they are essentially limited by the quality of 3D reconstructions, where dense inputs (tens to hundreds) with large overlap and reasonable baselines are necessary for decent results. These methods estimate geometry as an intermediate task not directly optimized for image quality. In contrast, we input sparse views and learn depth jointly to optimize for synthesis quality.

Neural Scene Representations. Recent work uses implicit scene representations for view synthesis [Ref. 59, 39, 17, 32, 45, 52]. Given many views, neural radiance fields (NeRF) show impressive results [Ref. 46, 85, 44, 53, 75], but require expensive per-scene optimization. Recent methods [Ref. 72, 82, 69, 7, 29] generalize NeRF without per-scene optimization by learning a shared prior, focusing on very sparse input views. However these methods require expensive ray sampling and therefore are very slow. In contrast, we achieve significant speedup (140-1000×) using explicit representations. Some concurrent work accelerates NeRF by reformulating the computation [Ref. 16], using precomputation [Ref. 81, 25], or adding view dependence to explicit 3D representations [Ref. 39, 77]; unlike ours, these all require dense input views and per-scene optimization.

Utilizing RGB-D in NVS. The growing availability of annotated depth maps [Ref. 11, 4, 8, 1, 65, 62] facilitates depth utilization in NVS [Ref. 51, 38, 24], which serves as extra supervision or input to networks. Our method utilizes explicit depths as 3D representations, allowing using sensor depths as additional inputs for better quality. Given the increasing popularity of depth sensors, integrating sensor depths is a promising direction for real-world applications. Depth has been used in neural scene representations for speedups [Ref. 48, 67], spacer inputs [Ref. 14] and dynamic scenes [Ref. 78]. However, these works still require per-scene optimization. Utilizing RGB-D inputs to accelerate generalizable NeRF like [Ref. 82, 72] is still an open problem.

Differentiable Rendering and Refinement. We use advances in differentiable rendering [Ref. 40, 33, 9, 49, 41] to learn 3D end-to-end. Learned geometric representations rely heavily on rendering and refinement [Ref. 83, 79, 2, 73] to quickly synthesize realistic results. Refinement has improved dramatically owing to advances in generative modeling [Ref. 36, 34, 84, 88] and rendering frameworks [Ref. 55, 30, 47, 28]. Although information across viewpoints is typically aggregated before rendering [Ref. 42], we propose to render viewpoints separately and combine using a transformer [Ref. 70, 15, 3], enabling attention across input views.

3. METHOD

Given a sparse set of input images $\{I_i\}_{i=1}^N$ and corresponding camera poses $\{Ri, Ti\}$, our goal is to synthesize a novel view with camera pose $\{Rt, Tt\}$ fast and effectively. The depths $\{D_i^{sen}\}$ of $I_i$ captured from sensors are optionally available, which are generally incomplete and noisy.

The insight of our method is that using explicit depths and forward warping enables real-time rendering speed and tremendous accelerations. Meanwhile, to alleviate quality degradations caused by inaccurate depth estimations, a differentiable renderer and well-designed fusion & refinement modules are required, encouraging the model to learn geometry and features optimized for synthesis quality.

Figure 2:
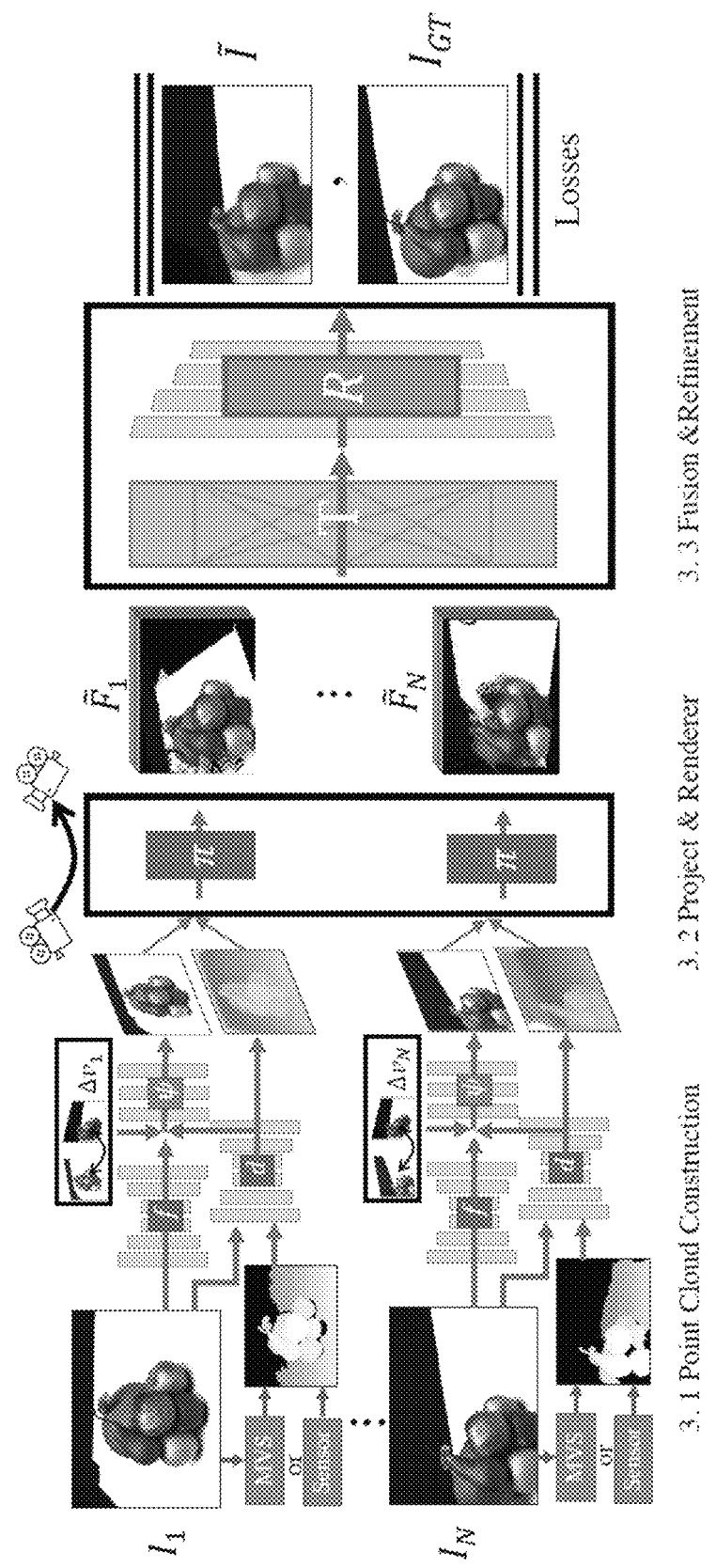
FIG. 2 shows a system overview. Given a sparse set of images, we construct a point cloud Pi for each image Ii using Feature Network f, View-Dependent Feature MLP W, and Depth Network d. Besides images, d takes multi-view stereo (MVS) estimated depths or sensor depths as inputs and regresses refined depths. Per-pixel features $F_i'$ are regressed by f and W based on images and relative view changes. A differentiable point cloud renderer $\pi$ is employed to project and render point clouds to target views. We use Transformer T to fuse rendered results from arbitrary number inputs and apply refinement module R for final results. The model is trained with photometric loss and content loss.

As illustrated in FIG. 2, with estimated depths, input view $I_i$ is converted to a 3D point cloud $P_i$ containing geometry and view-dependent semantics of the view. A differentiable neural point cloud renderer $\pi$ is used to project point clouds to target viewpoints. Rather than directly aggregating point clouds across views before rendering, we propose a Transformer-based module T fusing rendered results at target view. Finally, a refinement module R is employed to generate final outputs. The whole model is trained end-to-end with photometric and perceptual loss.

3.1. Point Cloud Construction

Using an explicit 3D representation is a natural way to inject 3D priors into the model. We use point clouds to represent scenes due to their efficiency, compact memory usage, and scalability to complex scenes. For input view we construct point cloud $P_i$ by estimating per-pixel depth $D_i$ and per-pixel feature vectors $F_i'$ at the same resolution as the input image, then projecting the feature vectors into 3D space using known camera intrinsics. The depth $D_i$ is estimated by a depth network d, giving 3D scene structure; features $F_i'$ are computed by a spatial feature encoder f and view-dependent MLP $\psi$, representing scene semantics.

Spatial Feature Encoder f. Scene semantics of input view $I_i$ are mapped to pixel-specific feature vectors $F_i$ by spatial feature encoder f. Each feature vector in $F_i$ is 61-dimensions and is concatenated with RGB channels for 64 dimensions. f is built on BigGAN architecture [Ref. 2].

Depth Network d. Estimating depth from a single image has scaling/shifting ambiguity, losing valuable multi-view cues and leading to inconsistent estimations across views. Applying multi-view stereo algorithms (MVS) [Ref. 60, 80, 71] solely on sparse inputs is challenging because of limited overlap and huge baselines between input views, leading to inaccurate and low-confidence estimations. Therefore, we employ a hybrid design cascading a U-Net after the MVS module. The U-Net takes image $I_i$ and estimated depths from the MVS module as inputs, refining depths with multiview stereo cues and image cues. PatchmatchNet [Ref. 71] is utilized as the MVS module, which is fast and lightweight.

Depth Estimation with sensor depths. As stated, U-Net receives an initial depth estimation from the MVS module and outputs a refined depth used to build the point cloud. If sensor depth $D_i^{sen}$ is available, it is directly input to the U-Net as the initial depth estimations. In this setting, U-Net servers as completion and refinement module taking $D_i^{sen}$ and $I_i$ as inputs, since $D_i^{sen}$ is usually noisy and incomplete. During training, loss $L_s$ is employed to encourage the U-Net output to match the sensor depth.

$$\mathcal{L}_s = \|M_i \odot D_i = M_i \lfloor D_i^{sen}\|\quad(1)$$

where $M_i$ is a binary mask indicating valid sensor depths.

View-Dependent Feature MLP $\psi$. The appearance of the same object varies across views because of lighting and view direction changes, introducing inconsistency between multiple views. The scene semantics is represented by spatial features $F_i$ and translated to the target view for synthesis. Therefore, view direction changes from input to target views should be inserted into scene semantics to model the view-dependent effects. We design an MLP $\psi$ to compute view-dependent spatial features $F_i$ by taking $F_i$ and relative view changes $\Delta_v$ as inputs. For each point in the cloud, $\Delta_v$ is calculated based on normalized view directions $v_i$ and $v_t$, from the point to camera centers of input view i and target view t. The relative view direction change is calculated as:

$$\Delta v = [(v_i - v_t)/\|v_i - v_t\|, v_i \cdot v_t], v_i, v_t \in \mathbb{R}^3.\quad(2)$$

and the view-dependent feature $F_i'$ is:

$$F_i' = \psi(F_i, \delta(\Delta v))\quad(3)$$

where $\delta$ is a two-layer MLP mapping $\Delta_v$ to a 32-dimensions vector and $\psi$ is also a two-layer MLP.

3.2. Point Cloud Renderer

After constructing a point cloud $P_i$ from view i containing the geometry and semantics of the scene, we expect to view $P_i$ at target views for synthesis. We use a neural point cloud $\pi$ to achieve it. $P_i$ is first transformed to target view coordinates based on relative camera poses and then rendered by $\pi$. The rendered results $\sim F_i$ are spatial feature maps, sharing the same dimension as feature $F_i'$ in $P_i$ at each pixel. With explicit geometry transformation and renderer satisfying geometry rules, our rendered results are geometrically consistent and correct across views.

As discussed, we expect this renderer to be fast and differentiable for speed and quality. We use the highly efficient renderer in Pytorch3D [Ref. 55], which splats points to a region and accumulates them based on blending weights for each pixel. The weight is computed based on depth, distance to rays cast from the pixel, and sphere radius.

This fully differentiable renderer allows our model to be trained end-to-end, where photometric and perceptual loss gradients can be propagated to points' position and features. In this way, the model learns to estimate depths and features optimized for synthesis quality, leading to superior quality. We show the effectiveness of it in experiments.

3.3. Fusion and Refinement

We fuse the point clouds constructed from each input view for synthesis. A naive fusion translates each point cloud to target view coordinates and aggregates them into a large one for rendering. Despite high efficiency, it is vulnerable to inaccurate depths since points with wrong depths may occlude points from other views, leading to degraded performance. Some regularizers like PointNet may be feasible to apply on the aggregated point cloud for refinement, but they are not efficient when point number is large.

Therefore, we instead render each point cloud individually at the target viewpoint and fuse the rendered results. We propose a novel Transformer-based fusion module T to fuse arbitrary size inputs and use a refinement module R to synthesize final results based on fused features.

Figure 3:
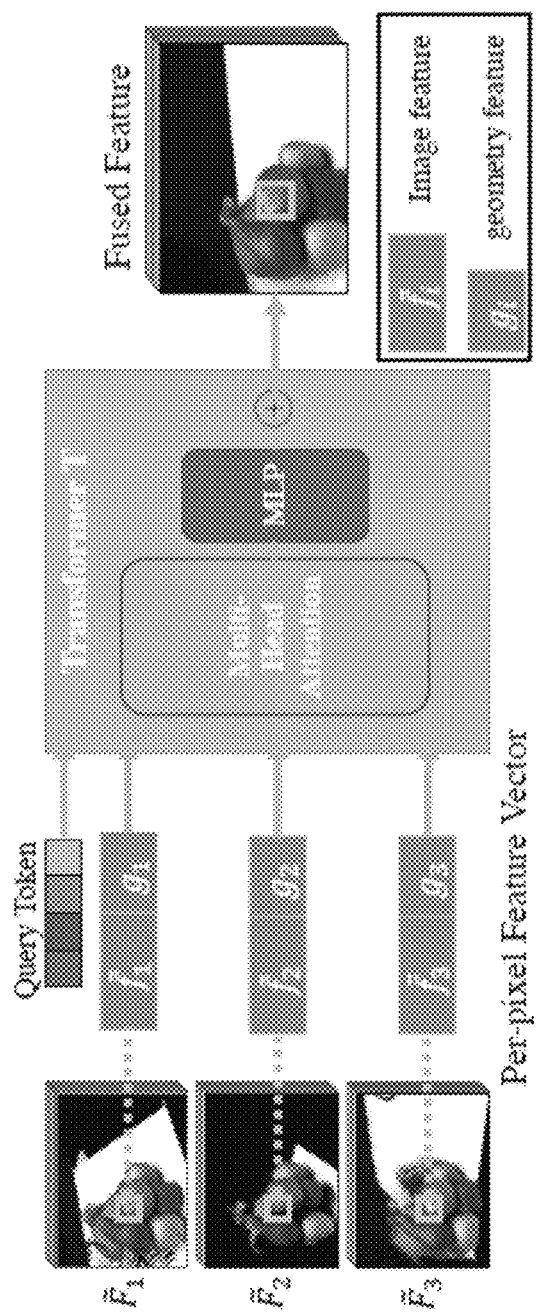
FIG. 3 shows a Fusion Transformer. We use a lightweight transformer T to fuse the features from N input views on each pixel. We use a learnable token to query the fusion results.

Fusion Transformer T. Given a set of feature maps $\{\tilde{F}_i\}$ rendered from point clouds, we fuse them into one feature map, which will be decoded into an RGB image by refinement module. The fusion operation should understand scene semantics, be fast and support arbitrary number of inputs in any order. We take advantage of progress on the Transformer and propose a pixel-wise Transformer T for fusion, which is detailed in FIG. 3. T extracts feature vectors from $\{\tilde{F}_i\}$ as inputs and output fused one at each pixel. It applies standard multi-head attention to the sequence of feature vectors and queries using an extra learnable "token". Applied on features, T utilizes scene semantics for fusion.

Fusing rendered feature maps may lose some helpful geometry information since it projects 3D to 2D. For instance, point clouds from different views may have meaningful occlusion relationships based on their relative depths. Also, rendered feature maps from views closer to target views are more robust and important than ones from distant views. To this end, we render depths at target view for each point cloud and compute the relative view changes from input to target views. We concatenate them as geometry features and use them as position encoding of the Transformer.

Refinement Module R. Refinement module R decodes fused feature maps $\tilde{F}$ to RGB images $\tilde{I}$ at target view. It will inpaint regions not visible in the input views in a semantically meaningful and geometrically accurate manner. Also, it corrects local errors caused by inaccurate depths and improves perceptual quality based on semantics contained by feature maps, leading to coherent and high-quality synthesis. R is built with 8 ResNet [Ref. 20] blocks.

3.4. Training and Implementation Details

Our model is trained end-to-end with photometric $\mathcal{L}_{l2}$ and perceptual $\mathcal{L}_c$ losses between generated and ground-truth target images. The whole loss function is:

$$\mathcal{L} = \lambda_{l2}\mathcal{L}_{l2} + \lambda_c \mathcal{L}_c \quad (4)$$

where $\lambda_{l2}=5:0$; $\lambda_c=1:0$. The model is trained end-to-end on 4 2080Ti GPUs for 2 days, using Adam [Ref. 35] with learning rate $10^{-4}$ and $\beta_1=0.9$; $\beta_2=0:999$. When sensors depths are available as inputs, $\mathcal{L}_s$ is used with $\lambda_s=5:0$.

4. EXPERIMENTS

The goal of our Example is real-time and generalizable novel view synthesis with sparse inputs, which can optionally use sensor depths. To this end, our experiments aim to identify the speed and quality at which our method can synthesize novel images and explore the advantage of explicit depths. We evaluate our methods on ShapeNet [Ref. 5] and DTU [Ref. 31] datasets, comparing results with the state of the art methods and alternative approaches. Experiments take place with held-out test scenes and no per-scene optimization. We conduct ablations to validate the effectiveness of designs.

Metrics. To measure image quality, we report the standard image quality metrics PSNR and SSIM [Ref. 74]. We also report LPIPS [Ref. 86], and find this metric best reflects the image quality as perceived by humans. Visual quality is also evaluated by conducting A/B testing, in which workers select the image most similar to the ground truth from competing methods. Inference speeds are measured in frames per second (FPS). All evaluations are conducted using the same protocol (same inputs and outputs), and rendering speed are measured on the same platform (1 2080Ti GPU with 4 CPU cores).

Model Variants. We evaluate three models with various accessibility to depths for training and inference, as defined in Table 1.

TABLE 1

Model variants settings. We predefine three model variants with different settings. FWD utilizes a pre-trained MVS module, in which way it gets access to depths during training.

| Name | Test Depth | Train Depth | Depth Network | MVS Module | Losses |
|---|---|---|---|---|---|
| FWD-U | | | MVS + U-Net | Random in | $\mathcal{L}_{l2} + \mathcal{L}_c$ |
| FWD | | ✓ | MVS + U-Net | Pre-trained | $\mathcal{L}_{l2} + \mathcal{L}_c$ |
| FWD-D | ✓ | ✓ | RGB-D + U-Net — | | $\mathcal{L}_{l2} + \mathcal{L}_c + \mathcal{L}_s$ |

FWD utilizes PatchmatchNet [Ref. 71] as the MVS module for depth estimations in complex scenes. PatchmatchNet is initialized from officially pre-trained weights on DTU dataset and updated during end-to-end training with photometric and perceptual loss. FWD-U learns depth estimations in an Unsupervised manner from scratch, sharing the same model and settings as FWD while PatchmatchNet is randomly initialized without any pretraining. FWD-D takes sensor depths as additional inputs during both training and inference. It doesn't use any MVS module since sensor depths provide abundant geometry cues.

Figure 9:
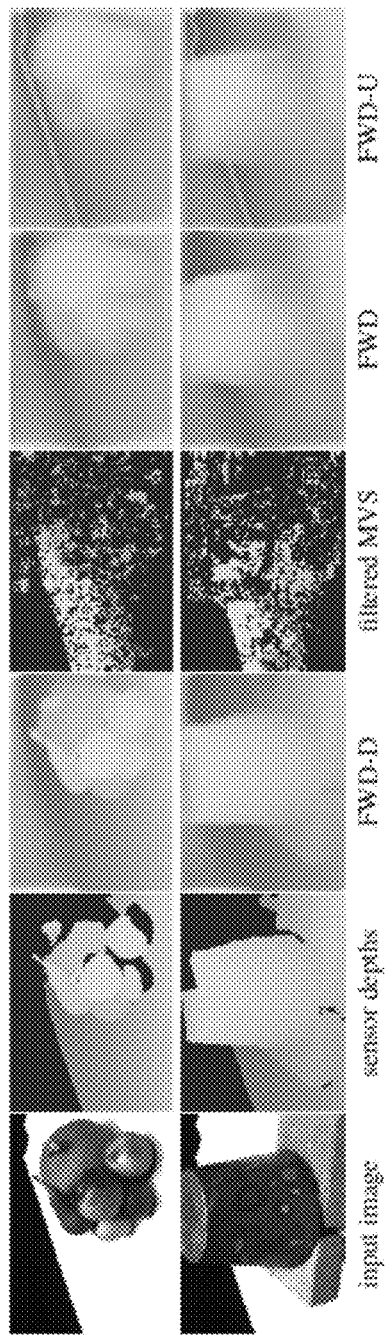
FIG. 9 shows depth visualizations. We visualize the normalized inverse depths involved in our method. Sensor depths are incomplete because of hardware limitations and MVS estimated depths are inaccurate, where many predictions have low confidence. This demonstrates the necessity of depth completion and refinement.

PatchmatchNet is pre-trained following typical MVS settings, which has distinct domain gaps between our settings since our input images share larger view change. We show the estimated depths from pre-trained PatchmatchNet in FIG. 9, which are inaccurate and relatively incomplete after filtering low-confidence regions.

4.1. ShapeNet Benchmarks

We first evaluate our approach on the category-agnostic view synthesis task on ShapeNet. Following the setting of [Ref. 82], we train and evaluate a single model on 13 ShapeNet categories. Each instance contains 24 fixed views of 64×64 resolution. During training, one random view is selected as input and the rest are served as target views. For testing, we synthesize all other views from a fixed informative view. The model is finetuned with two random input views for 2-view experiments. We find that U-Net is sufficient for good results on this synthetic dataset without the MVS module.

Figure 4:
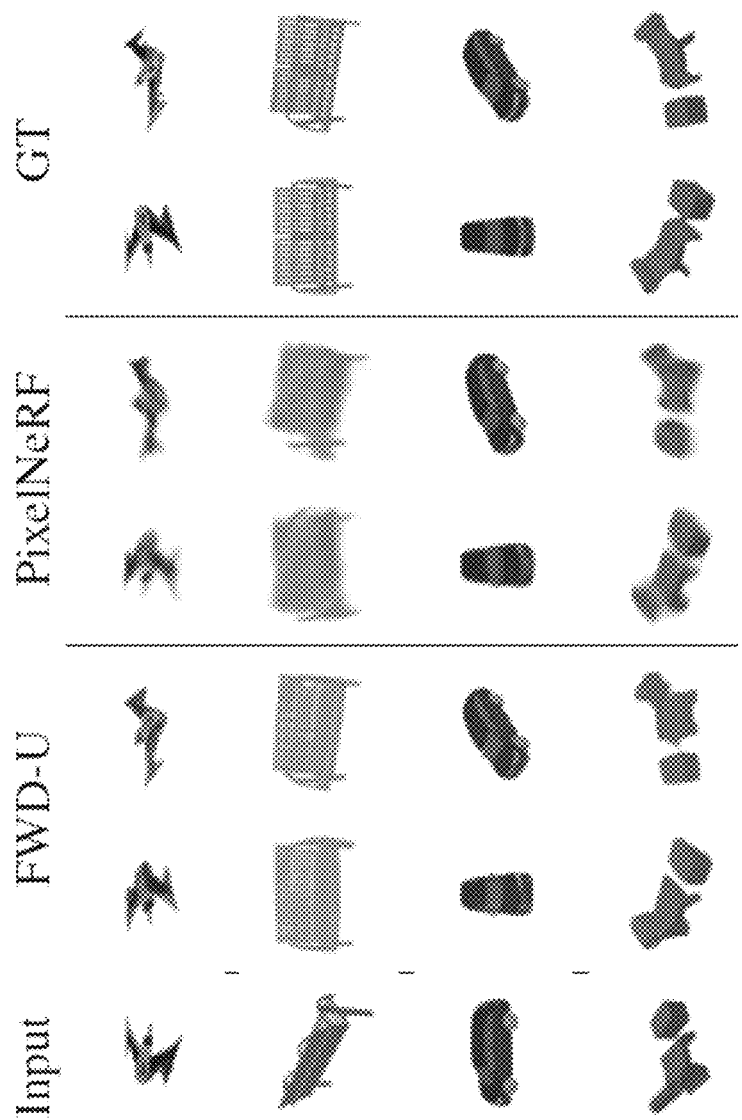
FIG. 4 shows qualitative results of category-agnostic NVS for ShapeNet. We test the capacity of our model by training it across 13 categories of ShapeNet in a single-view setting, and compare with PixelNeRF [Ref. 82]. No gt depths are available during inference. Our method gives results with better visual quality and details.

We show qualitative comparisons to PixelNeRF in FIG. 4, where FWD-U gets noticeably superior results. Our synthesized results are more realistic and closely matching to target views, while PixelNeRF's results tend to be blurry. We observe the same trend in the DTU benchmark and evaluate the visual quality quantitatively there.

We show quantitative results in Table 2, adding SRN [Ref. 64] and DVR [Ref. 50] as other baselines. Our method outperforms others significantly for LPIPS, indicating a much better perceptual quality, as corroborated by qualitative results. PixelNeRF has a slightly better PSNR while its results are blurry. Most importantly, FWD-U runs at a speed of over 300 FPS, which is 300×faster than PixelNeRF.

TABLE 2

Category-agnostic NVS on ShapeNet. Quantitative results
for category-agnostic view-synthesis are presented.

| model | 1-view | | | | 2-view | | | |
|---|---|---|---|---|---|---|---|---|
| | PSNR | SSIM | LPIPS | FPS | PSNR | SSIM | LPIPS | FPS |
| DVR [53] | 22.70 | 0.860 | 0.130 | 1.5 | — | — | — | — |
| SRN [70] | 23.28 | 0.849 | 0.139 | 24 | — | — | — | — |
| PixelNeRF | 26.80 | 0.910 | 0.108 | 1.2 | 28.88 | 0.936 | 0.076 | 1.1 |
| FWD-U | 26.66 | 0.911 | 0.055 | 364 | 28.43 | 0.931 | 0.043 | 336 |

4.2. DTU MVS Benchmarks

We further evaluate models on DTU MVS dataset [Ref. 31], which is a real scene dataset consisting of 103 scenes. Each scene contains one or multiple objects placed on a table, while images and incomplete depths are collected by the camera and structured light scanner mounted on an industrial robot arm. Corresponding camera poses are provided.

As stated in [Ref. 82], this dataset is challenging since it consists of complex real scenes without apparent semantic similarities across scenes. Also, images are taken under varying lighting conditions with distinct color inconsistencies between views. Moreover, with only under 100 scenes available for training, it is prone to overfitting in training.

We follow the same training and evaluation pipelines as PixelNeRF [Ref. 82] for all methods to give a fair comparison. The data consists of 88 training and 15 test scenes, between which there are no shared or highly similar scenes. Images are down-sampled to a resolution of 300×400. For training, three input views are randomly sampled, with the rest as target views. For inference, we choose three fixed informative input views and synthesize other views of the scene.

Baselines. We evaluate a set of representatives of generalizable NeRF and IBR methods in two different scenarios: with RGB or RGB-D available as inputs during inference.

PixelNeRF [Ref. 82], IBRNet [Ref. 72] and MVSNeRF [Ref. 7] are the state-of-the-art generalizable NeRF variants, taking only RGB as inputs. We use the official PixelNeRF model trained on DTU MVS dataset and carefully retrain the IBRNet and MVSNeRF with the same 3-input-view settings. We also evaluate PixelNeRF-DS, which is PixelNeRF [Ref. 82] supervised with depths as reported in [Ref. 14]. Please note that IBRNet and MVSNeRF use different evaluations in their paper, where IBRNet uses 10 views for synthesis and MVSNeRF selects different input views for each target view.

A series of IBR methods are also evaluated. Since COLMAP [Ref. 60] fails to give reasonable outputs with sparse input images, methods using COLMAP like FVS [Ref. 56], DeepBlending [Ref. 23] cannot estimate scene geometry in this setting. For these methods, we use depths captured by sensors as estimated depths, which should give upper-bound performance of these methods. To better cope with missing regions, we add our refinement model to DeepBlending [Ref. 23] and retrain it on DTU dataset, termed Blending-R.

Figure 5:
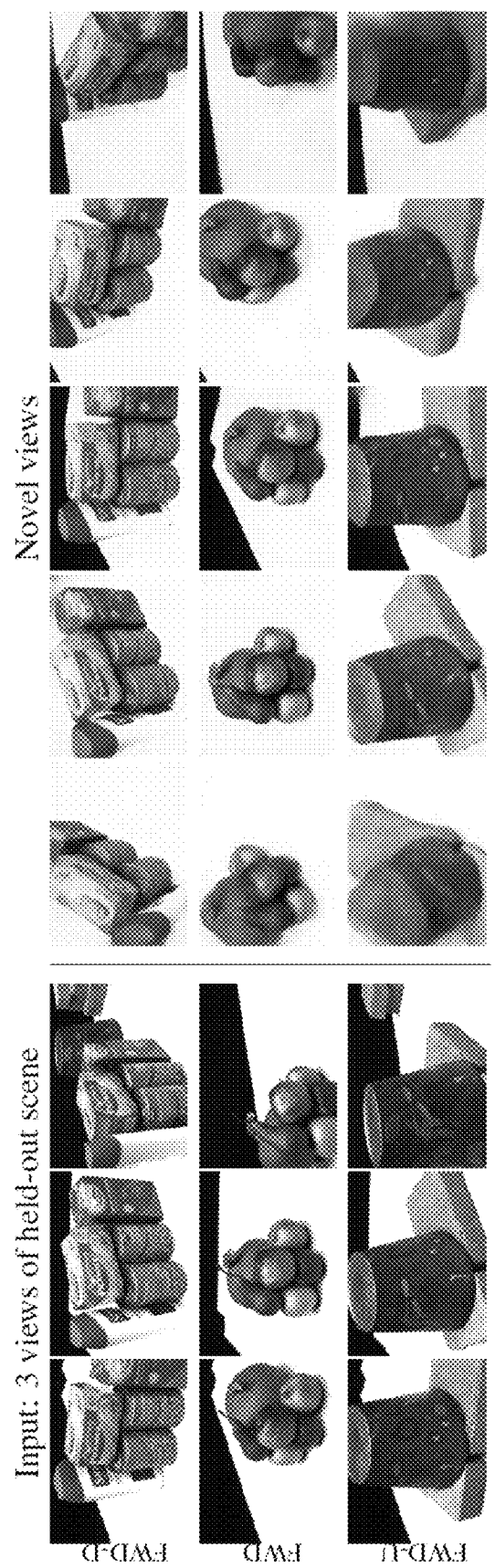
FIG. 5 shows view synthesis results from Forward Warping based on Depth (FWD). We show the view synthesis results with 3 input views on the DTU dataset from FWD-D (row. 1), FWD (row. 2) and FWD-U (row. 3). Our methods synthesize high-quality and geometrically correct novel views in real time.

Qualitative Results. Synthesis results are shown in FIG. 5, where high-quality and geometrically correct novel views are synthesized in real-time (over 35 FPS) under significant viewpoint changes. Our refinement model faithfully inpaints invisible regions; also, synthesized images have good shadows, light reflection, and varying appearance across views, showing the efficacy of feature-dependent MLP. With sensor depths, results can be further improved.

Figure 6:
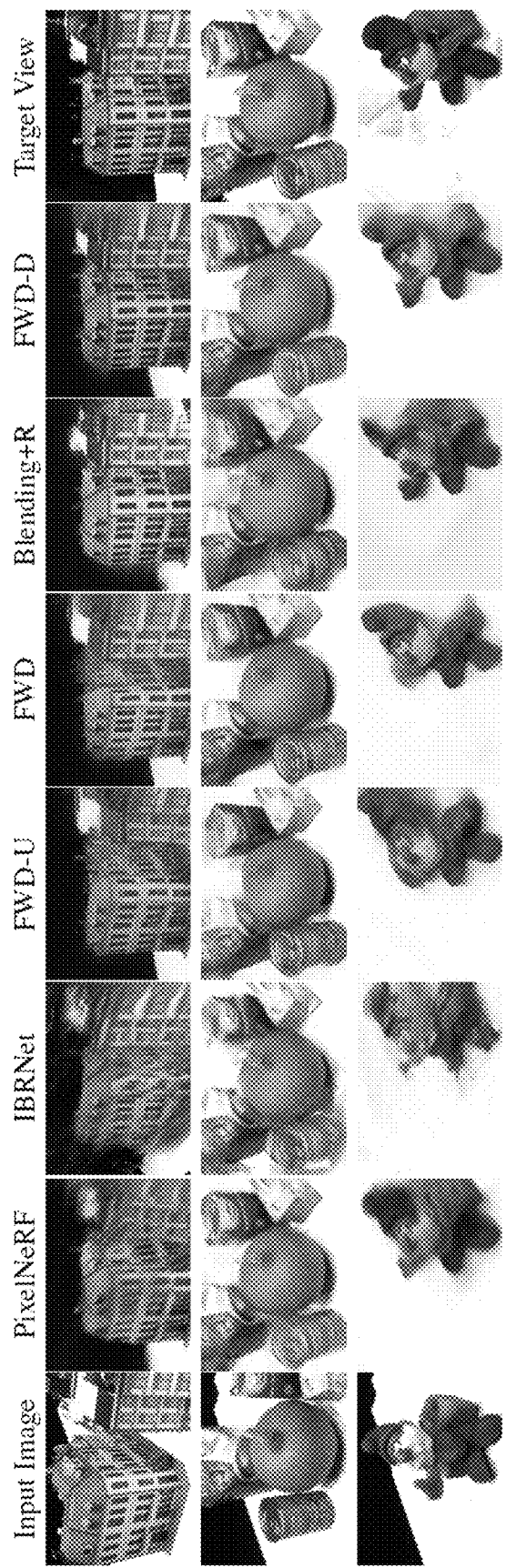
FIG. 6 shows a qualitative comparison. We compare synthesis results from different methods with 3 input views (one of them shown in figure). Our methods give geometrically consistent and visually appealing results, while other results suffering shaking artifacts at some views. Unlike other methods, FWD-D and Blending+R get access sensor depths as inputs during inference.

We show comparisons to baselines in FIG. 6. FWD provides noticeably better results than baselines across different depth settings. For models without depths in test, baselines IBRNet and PixelNeRF become blurry in areas of high detail such as the buildings in the top row, while our FWD-U and FWD give more realistic and sharper images. With sensor depths in test, baseline Blending-R produces more cogent outputs, but still struggles to distinguish objects from the background, such as in the middle row, while FWD-D gives faithfully synthesis and clear boundaries.

Quantitative Results. We first evaluate synthesis quality by user study. We fellow a standard NB paradigm in which workers choose between competing methods the closest to a ground truth image. Workers are monitored using a qualifier and sentinel examples. All views in the test set (690 in total) are evaluated, and each view is judged by three workers.

Figure 7:
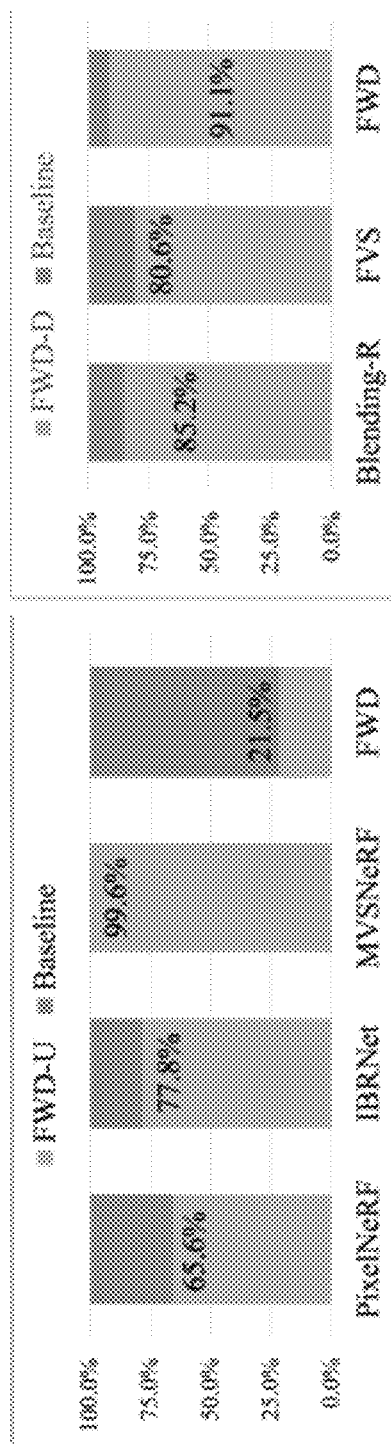
FIG. 7 shows a user study on DTU. We conduct a user study by asking subjects to select the results most similar to the ground truth. The numbers indicate the percentage of preference. Methods are grouped based whether using depths during test. We also report FWD vs. FWD-D showing the advantages of sensor depths.

User study results are consistent with qualitative observations, as shown in FIG. 7. Among all baselines with and without depths during test, users choose FWD as more closely matching ground truth images than others most of the time. For instance, FWD-U is selected over PixelNeRF in 65.6% of examples, and 77.8% compared to IBRNet. Also, over 90% workers prefer FWD-D to FWD or FWD-U, showing a huge advantage of integrating sensor depths.

We show automated view synthesis metrics and speed in Table 3.

TABLE 3

Quantitative comparison on DTU real images. We compare our
method with representatives of generalizable NeRF variants
and IBR methods for image quality and rendering speed. Our
method achieves significantly better speed-quality tradeoff,
indicating the effectiveness and efficiency of our design.

| Test | Train | Model | PSNR↑ | SSIM↑ | LPIPS↓ | FPS↓ |
|---|---|---|---|---|---|---|
| RGB | RGB | PixelNeRF [89] | 19.24 | 0.687 | 0.399 | 0.03 |
| | | IBRNet [78] | 18.86 | 0.695 | 0.387 | 0.27 |
| | | MVSNeRF [9] | 13.77 | 0.619 | 0.563 | 0.11 |

TABLE 3-continued

Quantitative comparison on DTU real images. We compare our method with representatives of generalizable NeRF variants and IBR methods for image quality and rendering speed. Our method achieves significantly better speed-quality tradeoff, indicating the effectiveness and efficiency of our design.

| Test | Train | Model | PSNR↑ | SSIM↑ | LPIPS↓ | FPS↓ |
|---|---|---|---|---|---|---|
| | | SynSin [82] † | 1.5.66 | 0.564 | 0.388 | 51.8 |
| | | FWD-U | 17.42 | 0.598 | 0.341 | 35.4 |
| RGB | RGB-D | PixelNeRF-DS [16] | 19.87 | 0.710 | 0.370 | 0.03 |
| | | FWD | 20.15 | 0.721 | 0.259 | 35.4 |
| RGB-D | RGB-D | Blending-R [25] | 16.98 | 0.661 | 0.351 | 41.8 |
| | | FVS [61] | 15.92 | 0.733 | 0,267 | 9.70 |
| | | FWD-D | 21.98 | 0.791 | 0.208 | 43.2 |

† Unlike other methods, SynSin receives only one image as input.

Across all three depth availability settings, FWD is competitive with the state of the art baselines while significantly faster. FWD-D runs in real-time and gives substantially better image quality than others. FWD has competitive metrics to PixelNeRF-DS while 1000×faster. Notably, NeRF variants such as PixelNeRF, IBRNet, MVSNeRF, and PixelNeRF-DS are two orders of magnitude slower.

The exception to highly competitive performance is weaker PSNR and SSIM of our unsupervised FWD-U against PixelNeRF and IBRNet. However, FWD-U has better perceptual quality since it has the best LPIPS, and human raters prefer it to other methods in NB tests. FIG. 6 also illustrates the disparity between comparisons using PSNR and LPIPS. Meanwhile, FWD-U is above 1000× faster than PixelNeRF and above 100× faster than IBRNet. In our method, depth estimations, rendering and even CNN would introduce tiny pixel shiftings, which harm the PSNR. PixelNeRF and IBRNet synthesize every pixel independently supervised by L2 loss, leading to blurred results.

Among all methods without test depths, FWD has the best perceptual quality, LPIPS, and second-best PSNR and SSIM. Although it uses a pretrained MVS module, we think this comparison is still reasonable since pretrained depth module is easy to get. Also, training depths can be easily calculated from training images since they are dense.

Baseline comparisons also show that IBR methods are fast, but do not give images that are competitive with our method. Our method outperforms them in both perceptual quality and standard metrics, showing the efficacy of proposed methods. We also compare FWD-U with SynSin [Ref. 76] which only receives a single input image, showing the benefits of using multi-view inputs in NVS.

4.3. Ablations and Analysis

We evaluate the effectiveness of our designs and study depth in more detail through ablation experiments.

Figure 8:
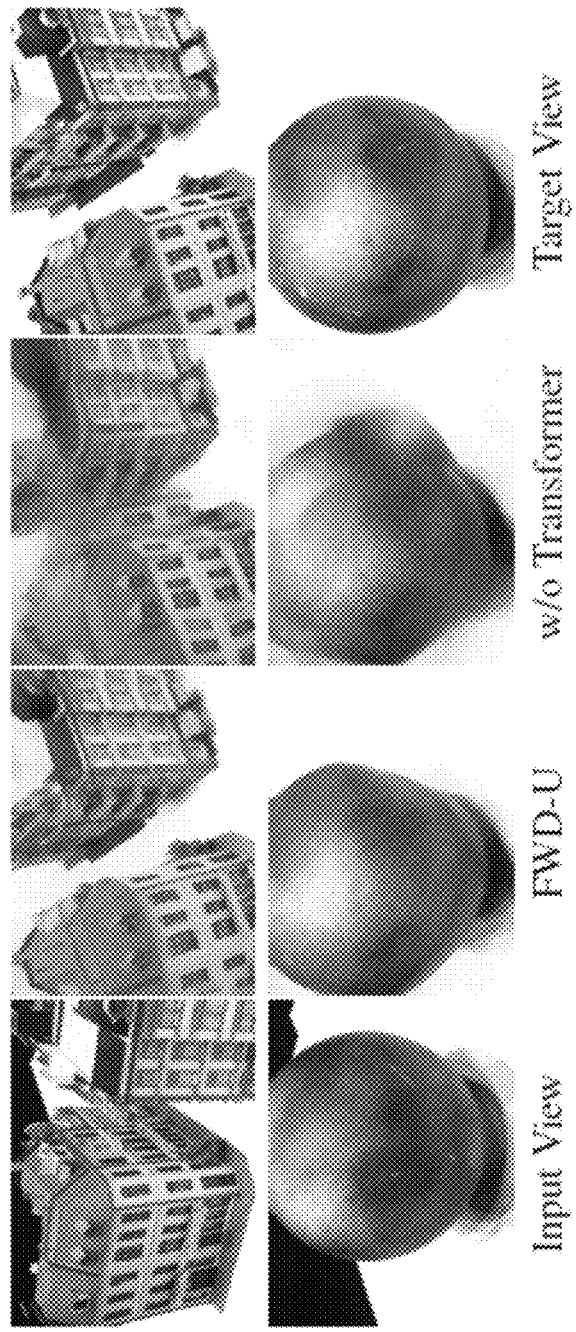
FIG. 8 shows Ablation on Fusion Transformer. We show results for FWD-U with and without Transformed-based fusion.

Effects of Fusion Transformer. We design a model without Transformer which concatenates point clouds across views into a bigger one for later rendering and refinement. Its results in FWD-U settings are shown in FIG. 8. The ablated version cannot deal with inaccurate depths learned in unsupervised manner and synthesize "ghost objects" since points with bad depths occlude other views' points.

We repeat this ablation for FWD-D in Table 4 which should give much better depth estimations with sensor depths inputs. The ablated model has notably worse results for all metrics. Ablation results indicate that the proposed method is powerful to tackle inaccurate depth estimations and fuse semantic features across views as well.

Effects of View Dependent MLP. For ablation, we remove the view-dependent feature MLP and report its results in Table 4.

TABLE 4

Ablation Studies. We show the effectiveness of Transformer Fusion and View-dependent MLP by ablation study on FWD-D. These designs improve synthesize quality noticeably while maintaining real-time rendering speed.

| Model | PSNR | SSIM | LPIPS | FPS |
|---|---|---|---|---|
| Full model | 21.98 | 0.791 | 0.208 | 43.2 |
| w/o Transformer | 20.95 | 0.748 | 0.241 | 48.4 |
| w/o View dependence | 21.16 | 0.769 | 0.212 | 44.0 |

Removing this module reduces model's ability to produce view-dependent appearance, leading to worse performance for all metrics.

Depth Analysis and Ablations. We visualize depths in FIG. 9. Estimating depth from sparse inputs is challenging and less accurate because of huge baselines between inputs. We show estimated depths by pretrained PatchmatchNet, which are filtered based on the confidence scores. Therefore, propagating multi-view geometry cues to the whole image by refinement is important in our model. Our end-to-end model learns it by synthesis losses.

We ablate the depth network in Table 5, and report the difference between estimated and sensor depths as errors. MVS module is important (row 2), providing geometrically consistent depths and resolving scale/shift ambiguity. U-Net further improves the synthesis quality (row 3) and refines depths. PatchmatchNet has a shallow refinement layer in its model, giving decent refinements without our U-Net. Learning unsupervised depth estimations and view synthesis jointly from scratch is challenging (row 4).

TABLE 5

Depths network ablation and error. We ablate depth network and compute $\delta_{3\ cm}$ as error, which is the percentage of predicted depths within 3 cm of sensor depths.

| Test | Train | Model | PSNR | SSIM | LPIPS | $\delta_{3\ cm}$ |
|---|---|---|---|---|---|---|
| RGB | RGB-D | FWD | 20.15 | 0.721 | 0.259 | 79.07 |
| RGB | RGB-D | -w/o MVS | 16.69 | 0.594 | 0.357 | 61.62 |
| RGB | RGB-D | -w/o U-Net | 19.10 | 0.702 | 0.285 | 73.62 |
| RGB | RGB | FWD-U | 17.42 | 0.598 | 0.341 | 54.27 |

Training depth network without supervision [Ref. 12] first may give a good initialization for jointly training. We hypothesize that consistency between depths may be more important than errors, given that they are not perfectly aligned to quality.

5. CONCLUSION

We propose a real-time and generalizable method for NVS with sparse inputs by using explicit depths. Our experiments show that estimating depths can give impressive results with a real-time speed, outperforming existing methods. Moreover, the proposed method could utilize sensor depths seamlessly and improve synthesis quality significantly. With the increasing availability of mobile depth sensors, we believe our method has exciting real-world 3D applications.

REFERENCES

[1] Henrik Aanæs, Rasmus Ramsbøl Jensen, George Vogiatzis, Engin Tola, and Anders Bjorholm Dahl. Large-scale data for multiple-view stereopsis. *IJCV*, 120(2):153-168, 2016.
[2] Andrew Brock, Jeff Donahue, and Karen Simonyan. Large scale GAN training for high fidelity natural image synthesis. In ICLR, 2019.
[3] Nicolas Carion, Francisco Massa, Gabriel Synnaeve, Nicolas Usunier, Alexander Kirillov, and Sergey Zagoruyko. End-to-end object detection with transformers. In ECCV, pages 213-229. Springer, 2020.
[4] Angel Chang, Angela Dai, Thomas Funkhouser, Maciej Halber, Matthias Niessner, Manolis Savva, Shuran Song, Andy Zeng, and Yinda Zhang. Matterport3d: Learning from rgbd data in indoor environments. *International Conference on 3D Vision* (3DV), 2017.
[5] Angel X Chang, Thomas Funkhouser, Leonidas Guibas, Pat Hanrahan, Qixing Huang, Zimo Li, Silvio Savarese, Manolis Savva, Shuran Song, Hao Su, et al. Shapenet: An information-rich 3d model repository. Technical Report arXiv:1512.03012, 2015.
[6] Gaurav Chaurasia, Sylvain Duchene, Olga Sorkine-Hornung, and George Drettakis. Depth synthesis and local warps for plausible image-based navigation. *ACM Transactions on Graphics* (TOG), 32(3):1-12, 2013.
[7] Anpei Chen, Zexiang Xu, Fuqiang Zhao, Xiaoshuai Zhang, Fanbo Xiang, Jingyi Yu, and Hao Su. Mvsnerf: Fast generalizable radiance field reconstruction from multi-view stereo. arXiv preprint arXiv:2103.15595, 2021.
[8] Weifeng Chen, Zhao Fu, Dawei Yang, and Jia Deng. Singleimage depth perception in the wild. In NeurIPS, volume 29, 2016.
[9] Wenzheng Chen, Jun Gao, Huan Ling, Edward J Smith, Jaakko Lehtinen, Alec Jacobson, and Sanja Fidler. Learning to predict 3d objects with an interpolation-based differentiable renderer. 2019.
[10] Inchang Choi, Orazio Gallo, Alejandro Troccoli, Min H Kim, and Jan Kautz. Extreme view synthesis. In ICCV, pages 7781-7790, 2019.
[11] Angela Dai, Angel X. Chang, Manolis Savva, Maciej Halber, Thomas Funkhouser, and Matthias Nießner. Scannet: Richly-annotated 3d reconstructions of indoor scenes. In Proc. Computer Vision and Pattern Recognition (CVPR), IEEE, 2017.
[12] Yuchao Dai, Zhidong Zhu, Zhibo Rao, and Bo Li. Mvs2: Deep unsupervised multi-view stereo with multi-view symmetry. In 2019 *International Conference on 3D Vision* (3DV), pages 1-8, 2019.
[13] Paul E Debevec, Camillo J Taylor, and Jitendra Malik. Modeling and rendering architecture from photographs: A hybrid geometry- and image-based approach. In *Proceedings of the 23rd annual conference on Computer graphics and interactive techniques*, pages 11-20, 1996.
[14] Kangle Deng, Andrew Liu, Jun-Yan Zhu, and Deva Ramanan. Depth-supervised nerf: Fewer views and faster training for free. arXiv preprint arXiv:2107.02791, 2021.
[15] Alexey Dosovitskiy, Lucas Beyer, Alexander Kolesnikov, Dirk Weissenborn, Xiaohua Zhai, Thomas Unterthiner, Mostafa Dehghani, Matthias Minderer, Georg Heigold, Sylvain Gelly, et al. An image is worth 16×16 words: Transformers for image recognition at scale. arXiv preprint arXiv:2010.11929, 2020.
[16] Stephan J Garbin, Marek Kowalski, Matthew Johnson, Jamie Shotton, and Julien Valentin. Fastnerf: High-fidelity neural rendering at 200 fps. arXiv preprint arXiv:2103.10380, 2021.
[17] Kyle Genova, Forrester Cole, Avneesh Sud, Aaron Sarna, and Thomas Funkhouser. Local deep implicit functions for 3d shape. In Proceedings of the IEEE/CVF Conference on Computer Vision and Pattern Recognition, pages 4857-4866, 2020.
[18] Steven J Gortler, Radek Grzeszczuk, Richard Szeliski, and Michael F Cohen. The lumigraph. In *Proceedings of the 23rd annual conference on Computer graphics and interactive techniques*, pages 43-54, 1996.
[19] Pengsheng Guo, Miguel Angel Bautista, Alex Colburn, Liang Yang, Daniel Ulbricht, Joshua M Susskind, and Qi Shan. Fast and explicit neural view synthesis. arXiv preprint arXiv:2107.05775, 2021.
[20] Kaiming He, Xiangyu Zhang, Shaoqing Ren, and Jian Sun. Deep residual learning for image recognition. In CVPR, pages 770-778, 2016.
[21] Peter Hedman and Johannes Kopf. Instant 3d photography. TOG, 37(4):1-12, 2018.
[22] Peter Hedman, Julien Philip, True Price, Jan-Michael Frahm, George Drettakis, and Gabriel Brostow. Deep blending for free-viewpoint image-based rendering. *ACM Transactions* on Graphics (TOG), 37(6):1-15, 2018.
[23] Peter Hedman, Julien Philip, True Price, Jan-Michael Frahm, George Drettakis, and Gabriel Brostow. Deep blending for free-viewpoint image-based rendering. 37(6):257:1-257:15, 2018.
[24] Peter Hedman, Tobias Ritschel, George Drettakis, and Gabriel Brostow. Scalable inside-out image-based rendering. ToG, 35(6):1-11, 2016.
[25] Peter Hedman, Pratul P Srinivasan, Ben Mildenhall, Jonathan T Barron, and Paul Debevec. Baking neural radiance fields for real-time view synthesis. arXiv preprint arXiv:2103.14645, 2021.
[26] Ronghang Hu and Deepak Pathak. Worldsheet: Wrapping the world in a 3d sheet for view synthesis from a single image. arXiv preprint arXiv:2012.09854, 2020.
[27] Po-Han Huang, Kevin Matzen, Johannes Kopf, Narendra Ahuja, and Jia-Bin Huang. Deepmvs: Learning multi-view stereopsis. *Conference on Computer Vision and Pattern Recognition* (CVPR), 2018. [28] Rui Huang, Wanyue Zhang, Abhijit Kundu, Caroline Pantofaru, David A
Ross, Thomas Funkhouser, and Alireza Fathi. An lstm approach to temporal 3d object detection in lidar point clouds. arXiv preprint arXiv:2007.12392, 2020.
[29] Ajay Jain, Matthew Tancik, and Pieter Abbeel. Putting nerf on a diet: Semantically consistent few-shot view synthesis. arXiv preprint arXiv:2104.00677, 2021

[30] Krishna Murthy Jatavallabhula, Edward Smith, Jean-Francois Lafleche, Clement Fuji Tsang, Artem Rozantsev, Wenzheng Chen, Tommy Xiang, Rev Lebaredian, and Sanja Fidler. Kaolin: A pytorch library for accelerating 3d deep learning research. arXiv preprint arXiv:1911.05063, 2019.

[31] Rasmus Jensen, Anders Dahl, George Vogiatzis, Engil Tola, and Henrik Aanæs. Large scale multi-view stereopsis evaluation. *In 2014 IEEE Conference on Computer Vision and Pattern Recognition*, pages 406-413. IEEE, 2014.

[32] Chiyu Jiang, Avneesh Sud, Ameesh Makadia, Jingwei Huang, Matthias Nießner, Thomas Funkhouser, et al. Local implicit grid representations for 3d scenes. In *Proceedings of the IEEE/CVF Conference on Computer Vision and Pattern Recognition*, pages 6001-6010, 2020.

[33] Yue Jiang, Dantong Ji, Zhizhong Han, and Matthias Zwicker. Sdfdiff: Differentiable rendering of signed distance fields for 3d shape optimization. In *Proceedings of the IEEE/CVF Conference on Computer Vision and Pattern Recognition*, pages 1251-1261, 2020.

[34] Tero Karras, Samuli Laine, Miika Aittala, Janne Hellsten, Jaakko Lehtinen, and Timo Aila. Analyzing and improving the image quality of stylegan. In CVPR, pages 8110-8119, 2020.

[35] Diederik P Kingma and Jimmy Ba. Adam: A method for stochastic optimization. 2015.

[36] C. Ledig, L. Theis, F. Husz'ar, J. Caballero, A. Cunningham, A. Acosta, A. Aitken, A. Tejani, J. Totz, Z. Wang, and W. Shi. Photo-realistic single image super-resolution using a generative adversarial network. In CVPR, pages 105-114, 2017.

[37] Marc Levoy and Pat Hanrahan. Light field rendering. In Proceedings of the 23rd annual conference on Computer graphics and interactive techniques, pages 31-42, 1996.

[38] Andrew Liu, Richard Tucker, Varun Jampani, Ameesh Makadia, Noah Snavely, and Angjoo Kanazawa. Infinite nature: Perpetual view generation of natural scenes from a single image. arXiv preprint arXiv:2012.09855, 2020.

[39] Lingjie Liu, Jiatao Gu, Kyaw Zaw Lin, Tat-Seng Chua, and Christian Theobalt. Neural sparse voxel fields. arXiv preprint arXiv:2007.11571, 2020.

[40] Shichen Liu, Weikai Chen, Tianye Li, and Hao Li. Soft rasterizer: Differentiable rendering for unsupervised singleview mesh reconstruction. ICCV, 2019.

[41] Shaohui Liu, Yinda Zhang, Songyou Peng, Boxin Shi, Marc Pollefeys, and Zhaopeng Cui. Dist: Rendering deep implicit signed distance function with differentiable sphere tracing. In *Proceedings of the IEEE/CVF Conference on Computer Vision and Pattern Recognition*, pages 2019-2028, 2020.

[42] Stephen Lombardi, Tomas Simon, Jason Saragih, Gabriel Schwartz, Andreas Lehrmann, and Yaser Sheikh. Neural volumes: Learning dynamic renderable volumes from images. arXiv preprint arXiv:1906.07751, 2019.

[43] Xuan Luo, Jia-Bin Huang, Richard Szeliski, Kevin Matzen, and Johannes Kopf. Consistent video depth estimation. *ACM Transactions on Graphics* (TOG), 39(4):71-1, 2020.

[44] Ricardo Martin-Brualla, Noha Radwan, Mehdi S. M. Sajjadi, Jonathan T. Barron, Alexey Dosovitskiy, and Daniel Duckworth. NeRF in the Wild: Neural Radiance Fields for Unconstrained Photo Collections. In CVPR, 2021.

[45] Lars Mescheder, Michael Oechsle, Michael Niemeyer, Sebastian Nowozin, and Andreas Geiger. Occupancy networks: Learning 3d reconstruction in function space. In *Proceedings of the IEEE/CVF Conference on Computer Vision and Pattern Recognition*, pages 4460-4470, 2019.

[46] Ben Mildenhall, Pratul P. Srinivasan, Matthew Tancik, Jonathan T. Barron, Ravi Ramamoorthi, and Ren Ng. Nerf: Representing scenes as neural radiance fields for view synthesis. In ECCV, 2020.

[47] Mahyar Najibi, Guangda Lai, Abhijit Kundu, Zhichao Lu, Vivek Rathod, Thomas Funkhouser, Caroline Pantofaru, David Ross, Larry S Davis, and Alireza Fathi. Dops: learning to detect 3d objects and predict their 3d shapes. In CVPR, pages 11913-11922, 2020.

[48] Thomas Neff, Pascal Stadlbauer, Mathias Parger, Andreas Kurz, Joerg H Mueller, Chakravarty R Alla Chaitanya, Anton Kaplanyan, and Markus Steinberger. Donerf: Towards realtime rendering of compact neural radiance fields using depth oracle networks. arXiv preprint arXiv:2103.03231, 2021.

[49] Michael Niemeyer, Lars Mescheder, Michael Oechsle, and Andreas Geiger. Differentiable volumetric rendering: Learning implicit 3d representations without 3d supervision. In Proceedings of the IEEE/CVF Conference on Computer Vision and Pattern Recognition, pages 3504-3515, 2020.

[50] Michael Niemeyer, Lars Mescheder, Michael Oechsle, and Andreas Geiger. Differentiable volumetric rendering: Learning implicit 3d representations without 3d supervision. In Proc. IEEE Conf. on Computer Vision and Pattern Recognition (CVPR), 2020.

[51] David Novotny, Ben Graham, and Jeremy Reizenstein. Perspectivenet: A scene-consistent image generator for new view synthesis in real indoor environments. *Advances in Neural Information Processing Systems*, 32:7601-7612, 2019.

[52] Jeong Joon Park, Peter Florence, Julian Straub, Richard Newcombe, and Steven Lovegrove. Deepsdf: Learning continuous signed distance functions for shape representation. In *Proceedings of the IEEE/CVF Conference on Computer Vision and Pattern Recognition*, pages 165-174, 2019.

[53] Keunhong Park, Utkarsh Sinha, Jonathan T. Barron, Sofien Bouaziz, Dan B Goldman, Steven M. Seitz, and Ricardo Martin-Brualla. Deformable neural radiance fields. arXiv preprint arXiv:2011.12948, 2020.

[54] Eric Penner and Li Zhang. Soft 3d reconstruction for view synthesis. ToG, 36(6):1-11, 2017.

[55] Nikhila Ravi, Jeremy Reizenstein, David Novotny, Taylor Gordon, Wan-Yen Lo, Justin Johnson, and Georgia Gkioxari. Accelerating 3d deep learning with pytorch3d. arXiv preprint arXiv:2007.08501, 2020.

[56] Gernot Riegler and Vladlen Koltun. Free view synthesis. In ECCV, pages 623-640. Springer, 2020.

[57] Gernot Riegler and Vladlen Koltun. Stable view synthesis. In *Proceedings of the IEEE Conference on Computer Vision and Pattern Recognition*, 2021.

[58] Chris Rockwell, David F. Fouhey, and Justin Johnson. Pixelsynth: Generating a 3d-consistent experience from a single image. In ICCV, 2021.

[59] Robin Rombach, Patrick Esser, and Bjorn Ommer. Geometry-free view synthesis: Transformers and no 3d priors. arXiv preprint arXiv:2104.07652, 2021.

[60] Johannes Lutz Schönberger, Enliang Zheng, Marc Pollefeys, and Jan-Michael Frahm. Pixelwise view selection for unstructured multi-view stereo. In *European Conference on Computer Vision* (ECCV), 2016.

[61] Meng-Li Shih, Shih-Yang Su, Johannes Kopf, and Jia-Bin Huang. 3d photography using context-aware layered depth inpainting. In *Proceedings of the IEEE/CVF Conference on Computer Vision and Pattern Recognition*, pages 8028-8038, 2020.

[62] Nathan Silberman, Derek Hoiem, Pushmeet Kohli, and Rob Fergus. Indoor segmentation and support inference from rgbd images. In ECCV, pages 746-760, 2012.

[63] Vincent Sitzmann, Justus Thies, Felix Heide, Matthias Nießner, Gordon Wetzstein, and Michael Zollhofer. Deepvoxels: Learning persistent 3d feature embeddings. In CVPR, pages 2437-2446, 2019.

[64] Vincent Sitzmann, Michael Zollhoefer, and Gordon Wetzstein. Scene representation networks: Continuous 3d-structure-aware neural scene representations. In H. Wallach, H. Larochelle, A. Beygelzimer, F. dAlch'e-Buc, E. Fox, and R. Garnett, editors, *Advances in Neural Information Processing Systems*, volume 32. Curran Associates, Inc., 2019.

[65] Shuran Song, Samuel P Lichtenberg, and Jianxiong Xiao. Sun rgb-d: A rgb-d scene understanding benchmark suite. In CVPR, pages 567-576, 2015.

[66] Pratul P Srinivasan, Richard Tucker, Jonathan T Barron, Ravi Ramamoorthi, Ren Ng, and Noah Snavely. Pushing the boundaries of view extrapolation with multiplane images. In CVPR, pages 175-184, 2019.

[67] Karl Stelzner, Kristian Kersting, and Adam R Kosiorek. Decomposing 3d scenes into objects via unsupervised volume segmentation. arXiv preprint arXiv:2104.01148, 2021.

[68] Maxim Tatarchenko, Alexey Dosovitskiy, and Thomas Brox. Multi-view 3d models from single images with a convolutional network. In *European Conference on Computer Vision*, pages 322-337. Springer, 2016.

[69] Alex Trevithick and Bo Yang. Grf: Learning a general radiance field for 3d scene representation and rendering. arXiv preprint arXiv:2010.04595, 2020.

[70] Ashish Vaswani, Noam Shazeer, Niki Parmar, Jakob Uszkoreit, Llion Jones, Aidan N. Gomez, Lukasz Kaiser, and Illia Polosukhin. Attention is all you need. 2017.

[71] Fangjinhua Wang, Silvano Galliani, Christoph Vogel, Pablo Speciale, and Marc Pollefeys. Patchmatchnet: Learned multi-view patchmatch stereo. arXiv preprint arXiv:2012.01411, 2020. [72] Qianqian Wang, Zhicheng Wang, Kyle Genova, Pratul Srinivasan, Howard Zhou, Jonathan T Barron, Ricardo Martin-Brualla, Noah Snavely, and Thomas Funkhouser. Ibrnet: Learning multi-view image-based rendering. arXiv preprint arXiv:2102.13090, 2021.

[73] Ting-Chun Wang, Ming-Yu Liu, Jun-Yan Zhu, Andrew Tao, Jan Kautz, and Bryan Catanzaro. High-resolution image synthesis and semantic manipulation with conditional gans. In CVPR, pages 8798-8807, 2018.

[74] Zhou Wang, Alan C Bovik, Hamid R Sheikh, and Eero P Simoncelli. Image quality assessment: from error visibility to structural similarity. *IEEE transactions on image processing*, 13(4):600-612, 2004.

[75] Zirui Wang, Shangzhe Wu, Weidi Xie, Min Chen, and Victor Adrian Prisacariu. Nerf—: Neural radiance fields without known camera parameters. arXiv preprint arXiv: 2102.07064, 2021.

[76] Olivia Wiles, Georgia Gkioxari, Richard Szeliski, and Justin Johnson. Synsin: End-to-end view synthesis from a single image. In *Proceedings of the IEEE/CVF Conference on Computer Vision and Pattern Recognition*, pages 7467-7477, 2020.

[77] Suttisak Wizadwongsa, Pakkapon Phongthawee, Jiraphon Yenphraphai, and Supasorn Suwajanakorn. Nex: Real-time view synthesis with neural basis expansion. arXiv preprint arXiv:2103.05606, 2021.

[78] Wenqi Xian, Jia-Bin Huang, Johannes Kopf, and Changil Kim. Space-time neural irradiance fields for free-viewpoint video. In *Proceedings of the IEEE/CVF Conference on Computer Vision and Pattern Recognition*, pages 9421-9431, 2021.

[79] Chao Yang, Xin Lu, Zhe Lin, Eli Shechtman, Oliver Wang, and Hao Li. High-resolution image inpainting using multiscale neural patch synthesis. In CVPR, pages 6721-6729, 2017.

[80] Yao Yao, Zixin Luo, Shiwei Li, Tian Fang, and Long Quan. Mvsnet: Depth inference for unstructured multiview stereo. In *Proceedings of the European Conference on Computer Vision* (ECCV), pages 767-783, 2018.

[81] Alex Yu, Ruilong Li, Matthew Tancik, Hao Li, Ren Ng, and Angjoo Kanazawa. PlenOctrees for real-time rendering of neural radiance fields. In arXiv, 2021.

[82] Alex Yu, Vickie Ye, Matthew Tancik, and Angjoo Kanazawa. pixelnerf: Neural radiance fields from one or few images. arXiv preprint arXiv:2012.02190, 2020.

[83] Jiahui Yu, Zhe Lin, Jimei Yang, Xiaohui Shen, Xin Lu, and Thomas S Huang. Generative image inpainting with contextual attention. In CVPR, pages 5505-5514, 2018.

[84] Han Zhang, Ian Goodfellow, Dim itris Metaxas, and Augustus Odena. Self-attention generative adversarial networks. In ICML, pages 7354-7363. PMLR, 2019.

[85] Kai Zhang, Gernot Riegler, Noah Snavely, and Vladlen Koltun. Nerf++: Analyzing and improving neural radiance fields. arXiv preprint arXiv:2010.07492, 2020.

[86] Richard Zhang, Phillip Isola, Alexei A Efros, Eli Shechtman, and Oliver Wang. The unreasonable effectiveness of deep features as a perceptual metric. In CVPR, pages 586-595, 2018.

[87] Tinghui Zhou, Richard Tucker, John Flynn, Graham Fyffe, and Noah Snavely. Stereo magnification: Learning view synthesis using multiplane images. In SIGGRAPH, 2018.

[88] Jun-Yan Zhu, Taesung Park, Phillip Isola, and Alexei A Efros. Unpaired image-to-image translation using cycle-consistent adversarial networks. In ICCV, 2017.

The citation of any document or reference is not to be construed as an admission that it is prior art with respect to the present invention.

Thus, the present invention provides a fast and generalizable novel view synthesis method with sparse inputs.

In light of the principles and example embodiments described and illustrated herein, it will be recognized that the example embodiments can be modified in arrangement and detail without departing from such principles. Also, the foregoing discussion has focused on particular embodiments, but other configurations are also contemplated. In particular, even though expressions such as "in one embodiment", "in another embodiment," or the like are used herein, these phrases are meant to generally reference embodiment possibilities, and are not intended to limit the invention to particular embodiment configurations. As used herein, these terms may reference the same or different embodiments that are combinable into other embodiments. As a rule, any embodiment referenced herein is freely combinable with any one or more of the other embodiments referenced herein, and any number of features of different embodiments are combinable with one another, unless indicated otherwise.

Although the invention has been described in considerable detail with reference to certain embodiments, one skilled in the art will appreciate that the present invention can be used in alternative embodiments to those described, which have been presented for purposes of illustration and not of limitation. Therefore, the scope of the appended claims should not be limited to the description of the embodiments contained herein.

What is claimed is:

1. A method for novel view synthesis, the method comprising:
   accessing at least a first input image with a first view of a subject in the first input image, and a second input image with a second view of the subject in the second input image using a computer system;
   estimating depths for pixels in the at least first and second input images;
   constructing a point cloud of image features from the estimated depths;
   synthesizing a novel view by forward warping by using a point cloud rendering of the constructed point cloud, wherein synthesizing the novel view includes generating fused data by fusing the at least first input image and the second input image, wherein generating fused data includes using a fusion Transformer T, and rendering a set of feature maps $\{\tilde{F}_i\}$ from the point cloud and fused into a feature map.

2. The method of claim 1, further comprising modeling view-dependent effects from the synthesized novel view.

3. The method of claim 2, wherein view-dependent effects include missing pixel data in the synthesized novel view.

4. The method of claim 1, wherein the feature map is decoded into an RGB image by a refinement module.

5. The method of claim 1, wherein the fusion Transformer T extracts feature vectors from $\{\tilde{F}i\}$ as inputs and output a fused one at each pixel.

6. The method of claim 1, further comprising generating output pixels for the synthesized novel view by inpainting missing pixel data based on the fused data.

7. The method of claim 1, wherein the synthesized novel view includes a viewpoint of the subject different from that at least first input and second input image.

8. The method of claim 1, wherein the computer system is further configured to access a plurality of input images.

9. The method of claim 1, wherein estimating the depth for pixels in the at least first and second input images includes inputting the at least first and second images to a multi-view stereo algorithm (MVS) module and receiving, from the MVS module, an initial depth estimation.

10. The method of claim 9, wherein estimating the depth further includes providing the initial depth estimation to a U-Net and receiving, from the U-Net a refined depth, wherein the refined depth is used to build the point cloud.

11. The method of claim 1, further including depth information from one or more sensors, wherein the estimated depths are based at least in part on the depth information.

12. A system for novel view synthesis, the system comprising:
   a computer system configured to:
   i) access at least a first input image with a first view of a subject in the first input image, and a second input image with a second view of the subject in the second input image;
   ii) estimate depths for pixels in the at least first and second input images;
   iii) construct a point cloud of image features from the estimated depths; and
   iv) synthesize a novel view by forward warping by using a point cloud rendering of the constructed point cloud, wherein synthesizing the novel view includes generating fused data using a fusion Transformer T, and rendering a set of feature maps $\{\tilde{F}i\}$ from the point cloud and fused into a feature map.

13. The system of claim 12, wherein the computer system is further configured to model view-dependent effects from the synthesized novel view.

14. The system of claim 13, wherein view-dependent effects include missing pixel data in the synthesized novel view.

15. The system of claim 13, wherein the generating the fused data includes fusing the at least first input image and the second input image.

16. The system of claim 15, wherein the computer system is further configured to generate output pixels for the synthesized novel view by inpainting missing pixel data based on the fused data.

17. The system of claim 12, wherein the computer system is further configured to decode the feature map into an RGB image using a refinement module.

18. The system of claim 12, wherein the computer system is further configured to extract feature vectors from $\{\tilde{F}i\}$ as inputs and output a fused one at each pixel using the fusion Transformer T.

19. The system of claim 12, wherein the synthesized novel view includes a viewpoint of the subject different from that at least first input and second input image.

20. The system of claim 12, wherein the computer system is further configured to access a plurality of input images.

* * * * *

UNITED STATES PATENT AND TRADEMARK OFFICE
CERTIFICATE OF CORRECTION

PATENT NO. : 12,348,700 B2
APPLICATION NO. : 17/739572
DATED : July 1, 2025
INVENTOR(S) : Justin Johnson et al.

It is certified that error appears in the above-identified patent and that said Letters Patent is hereby corrected as shown below:

In the Specification

Column 4, Line 34, "$\{I_i\}_{i=1}^{N}$" should be --$\{Ii\}_{i=1}^{N}$--.

Column 4, Line 62, "view a" should be --view $I_i$ a--.

Column 5, Line 2, "$\psi$ representing" should be --$\psi$, representing--.

Column 6, Line 44, "$\mathcal{L}_{12}$ 12 and perceptual $\mathcal{L}_c$ c losses" should be --$\mathcal{L}_{12}$ and perceptual $\mathcal{L}_c$ losses--.

Column 12, Line 58, "$\{I_i\}_{i=1}^{N}$" should be --$\{Ii\}_{i=1}^{N}$--.

Column 13, Line 20, "view we" should be --view $I_i$ we--.

Column 15, Line 22, "$\mathcal{L}_{12}$ 12" should be --"$\mathcal{L}_{12}$--.

Column 15, Line 23, "$\mathcal{L}_c$ c" should be --$\mathcal{L}_c$--.

Column 16, Table 1, Line 7, "in" should be --ini.--.

Column 18, Line 40, "NB" should be --A/B--.

Column 18, Table 3, Line 10, "0,619" should be --0.619--.

Column 19, Table 3, Line 8, "1.5.66" should be --15.66--.

Column 19, Line 29, "NB" should be --A/B--.

Signed and Sealed this
Ninth Day of September, 2025

Coke Morgan Stewart
*Acting Director of the United States Patent and Trademark Office*

CERTIFICATE OF CORRECTION (continued)
U.S. Pat. No. 12,348,700 B2

Column 24, Line 59, "Bjorn" should be --Björn--.

Column 26, Line 25, "Dim itris" should be --Dimitris--.